(12) United States Patent
Gnatiuk et al.

(10) Patent No.: US 12,098,292 B2
(45) Date of Patent: Sep. 24, 2024

(54) AQUEOUS PIGMENT CONCENTRATE, AQUEOUS INKJET INK AND USE THEREOF

(71) Applicant: TIGER COATINGS GMBH & CO. KG, Wels (AT)

(72) Inventors: Iurii Gnatiuk, Wels (AT); Christoph Lumetzberger, Wels (AT); Dieter Holzinger, Wels (AT)

(73) Assignee: TIGER COATINGS GMBH & CO. KG, Wels (AT)

( * ) Notice: Subject to any disclaimer, the term of this patent is extended or adjusted under 35 U.S.C. 154(b) by 54 days.

(21) Appl. No.: 17/754,058

(22) PCT Filed: Nov. 27, 2020

(86) PCT No.: PCT/EP2020/083756
§ 371 (c)(1),
(2) Date: Mar. 22, 2022

(87) PCT Pub. No.: WO2021/105443
PCT Pub. Date: Jun. 3, 2021

(65) Prior Publication Data
US 2022/0363928 A1 Nov. 17, 2022

(30) Foreign Application Priority Data

Nov. 29, 2019 (EP) .................................. 19212613

(51) Int. Cl.
*C09D 11/322* (2014.01)
*C09D 11/38* (2014.01)
*C09D 11/00* (2014.01)

(52) U.S. Cl.
CPC ............ *C09D 11/322* (2013.01); *C09D 11/38* (2013.01); *C09D 11/00* (2013.01)

(58) Field of Classification Search
CPC .. C08J 3/05; C08J 3/03; C09D 11/322; C09D 11/38; C09D 175/04; B41J 2/01
See application file for complete search history.

(56) References Cited

U.S. PATENT DOCUMENTS

| 5,852,075 | A | 12/1998 | Held |
| 6,818,054 | B2 | 11/2004 | Sano et al. |
| 2003/0081086 | A1 | 5/2003 | Suzuki et al. |
| 2003/0188665 | A1 | 10/2003 | Sano et al. |
| 2009/0264578 | A1* | 10/2009 | Minaki .............. C08G 18/0866 524/502 |
| 2013/0300799 | A1 | 11/2013 | Mizutani et al. |
| 2014/0002539 | A1* | 1/2014 | Goto .................... C09D 11/322 106/31.75 |
| 2014/0022321 | A1 | 1/2014 | Komatsu |
| 2014/0204156 | A1 | 7/2014 | Gotou |
| 2015/0138284 | A1 | 5/2015 | Nagashima et al. |
| 2016/0311233 | A1 | 10/2016 | Murai et al. |
| 2017/0282557 | A1 | 10/2017 | Murai et al. |
| 2017/0369725 | A1* | 12/2017 | Mitsuyoshi ............ C09D 11/38 |

FOREIGN PATENT DOCUMENTS

| CN | 1403511 | 3/2003 |
| CN | 103935148 | 7/2014 |
| EP | 1 469 049 | 10/2004 |
| WO | WO 2007/072951 | 6/2007 |
| WO | WO 2013/131924 | 9/2013 |
| WO | WO 2014/128115 | 8/2014 |

OTHER PUBLICATIONS

"BASF water-based resins for industrial coatings" (see English translation of corresponding CN Office Action dated Jun. 3, 2023).
Office Action issued in corresponding Chinese Application No. 202080082376.5, dated Jun. 3, 2023.
Office Action issued in corresponding Chinese Application No. 202080002376.5, dated Jan. 18, 2023. (English translation).
Extended European Search Report regarding European Application No. 19212613.4, dated Jan. 28, 2020, 7 pages.
Peng et al., "Influence of Substructures on the Spreading Ability and Hydrolysis Resistance of Double-Tail Trisiloxane Surfactants," *J Surfact Deterg* 13:75-81, 2010.
Griffin, "Classification of Surface-Active Agents by 'HLB'," *J. Soc. Cosmet. Chem.* 1:311-326, 1949.

* cited by examiner

Primary Examiner — John Zimmermann
(74) Attorney, Agent, or Firm — Norton Rose Fulbright US LLP

(57) ABSTRACT

The present invention provides an aqueous pigment concentrate comprising one or more pigments, wherein the total pigment concentration in the aqueous pigment concentrate is from 5 to 40 wt. %, one or more pigment dispersing agents, wherein the total pigment dispersing agent concentration in the aqueous pigment concentrate is from 0.5 to 5 wt. %, one or more non-ionic surfactants with a hydrophilic-lipophilic balance (HLB) value of at least (12), wherein the total concentration of non-ionic surfactants with an HLB value of at least (12) in the aqueous pigment concentrate is from 0.1 to 10 wt. %, and water as balance. Also provided is an aqueous ink comprising the aqueous pigment concentrate as well as a use thereof for inkjet printing, preferably on a corrugated board or on a liner for the production of corrugated board.

20 Claims, No Drawings

AQUEOUS PIGMENT CONCENTRATE, AQUEOUS INKJET INK AND USE THEREOF

CROSS-REFERENCE TO RELATED APPLICATIONS

This application is a national phase application under 35 U.S.C. § 371 of International Application No. PCT/EP2020/083756, filed Nov. 27, 2020, which claims priority to and the benefit of European Application No. 19212613.4, filed Nov. 29, 2019. The contents of the referenced applications are incorporated into the present application by reference.

FIELD OF THE PRESENT INVENTION

The present application relates to the field of inkjet printing. In one aspect of the present application, an aqueous pigment concentrate is provided. In a second aspect of the present application, an aqueous inkjet ink comprising a pigment concentrate according to the first aspect is provided. In a third aspect, a use of the ink for inkjet printing is provided.

BACKGROUND OF THE INVENTION

Corrugated board is produced by gluing at least one corrugated paper sheet and one or two flat paper sheets. One could use up to seven paper sheets for the production of corrugated boards (resulting in so-called triple wall corrugated boards). The corrugated board typically features the following most crucial characteristic: light paper is gaining an extraordinary stability/rigidity when fluted and glued together with flat paper sheets, thereby building up a hollow structure. In this way, a stable, lightweight material made of paper for various applications, in particular packaging applications, may be produced.

Nowadays corrugated board is used in different areas as packaging material. Apart from packaging of different commodity goods, primary or secondary packaging belongs to the main usage of corrugated board.

The main part of the used corrugated board for packaging applications requires a decorative appearance, which is typically achieved by applying a decorative print. Most of the corrugated board for packaging applications is decorated by analog flexographic printing, either in single or in multiple colours. The manufacturing of the printing cylinder, which is required for flexographic printing, is very complex and costly and therefore can be economically justified only at high numbers of the printed parts of the same design. As soon as any change in the printing design is required, new printing cylinders need to be manufactured.

When the number of printed samples is low/reduced, only digital printing is an industrially relevant, alternative printing technique that may be used for different substrates. Among the digital printing techniques, inkjet printing is most commonly used for the decoration of packaging material. In inkjet printing, the printhead(s) may be driven according to an electronical pattern across the substrate or may be fixed above the substrate (which is typically moved through the machine by a conveying system), thereby producing an image on the substrate when passing the printhead(s) once (single pass printing) or repeatedly (multi pass printing).

Inkjet printing is also a common method for applying a print on corrugated board, especially when the so called pre-print technique (the print is applied to a paper sheet before the manufacturing of the corrugated board) and/or the so called post-print technique (the print is applied onto the readymade corrugated board) is used.

A newer method is the integration of a printing unit (typically an inkjet printing unit) into a corrugated board manufacturing machine, which is also called corrugator (see e.g. DE 10 2013 202 871 A1 or WO 2014/128115 A1), or an in-line arrangement of a printing unit (typically an inkjet printing unit) and a corrugator within a corrugated board production line. This method has advantages as compared to the analog flexography printing in regard of the manufacturing costs and in production flexibility but also has advantages compared to conventional digital printing as pre-print or post-print. However, in-line digital printing in a corrugated board production line requires inks with exceptional requirements, like high frequency jettability, good drying performance, high stability, good wetting performance on a wide range of substrates, high water resistance as well as high abrasion resistance, in particular under heat exposure, to name a few.

Generally, aqueous inks for inkjet printing are known in the art. These are widely used in home and office applications. Typically for the previously mentioned applications, the aqueous inks are being printed with, so-called, bubble-jet print-heads. Here the ink is ejected from fine nozzles by local heating up of the ink up to vaporisation to create a bubble that presses an ink drop out of the nozzles. For industrial applications almost only piezo print-heads are used, where fine droplets are ejected from the nozzles by the deformation of piezo crystals.

US 2014/0022321 A1 describes an aqueous ink composition and a recording apparatus that can be used for recording on various types of recording media, wherein the ink composition can form images and characters exhibiting high rub fastness and little non-uniformity in density even on ink-non-absorbent and ink-low-adsorbent recording media. In addition, the ink can prevent nozzles from being clogged and can be stably stored. The ink composition comprises colouring material, 0%-20% of 1,2-pentanediol and 1,2-hexanediol.

US 2013/0300799 A1 describes an inkjet recording apparatus including a print head, a wiping mechanism and a cap member and further includes ink characteristics (1) and (2). (1) Ink jet recording ink composition, which includes a first resin having a heat distortion temperature of 10° C. or less. (2) Ink jet recording ink composition, which includes a second resin and includes substantially no glycerine.

U.S. Pat. No. 6,818,054 B2 describes the production of a pigment dispersion used in an ink composition for inkjet recording, involving dispersing a mixture comprising a pigment, a dispersant, a polysiloxane surfactant and/or an alkanediol, a polyhydric alcohol, and water. A process for producing an ink composition is also disclosed wherein the above pigment dispersion is mixed with a member selected from the group consisting of water, a surfactant, a wetting agent, a pH adjustor, and mixtures thereof. This ink composition is said to realize good image quality.

US 2016/311233 A1 relates to an ink jet printing method and an ink jet printing apparatus. White ink compositions are disclosed, comprising an urethane resin, a non-ionic surfactant and glycols.

US 2015/138284 A1 relates to an inkjet ink, an ink cartridge, and an inkjet recording device. The underlying aim was to provide an inkjet ink that exhibits good drying property and provides a printed portion having a high level of gloss and being excellent in scratch resistance, ethanol resistance, blocking resistance and light resistance when it is used for printing on a non-porous base material.

US 2017/282557 A1 relates to an image forming method. In the examples, an ink composition is disclosed which comprises an urethane-based fixing resin and a polyether-modified siloxane surfactant.

WO 2013/131924 A1 relates to a latex ink composition for inkjets. Example 1 discloses such a composition comprising an acrylic styrene copolymer emulsion and the anionic surfactant sodium dioctyl sulfosuccinate.

US 2014/022321 A1 concerns ink compositions with 1,2-pentanediol and 1,2-hexanediol. EP 1 469 049 A1 relates to water-based inkjet inks containing an ultraviolet curable humectant, in particular for cardboards. Examples 1 and 5 disclose aqueous ink compositions with 9% (w/w) acrylic resin and 0.3% (w/w) polyether-modified siloxane surfactant. The inkjet composition of example 5 also comprises 20% (w/w) glycerol is humectant. Example 5 is a comparative example to demonstrate that, upon application of the ink on the cardboard, evaporation without a UV-curable humectant takes a very long time.

WO 2007/072951 A1 relates to a pigment dispersion, a recording ink, an ink cartridge, an ink jet recording method, and an ink jet recording apparatus. Disclosed is a pigment dispersion, comprising a pigment, a pigment dispersant, a polymer dispersion stabiliser and water.

U.S. Pat. No. 5,852,075 A relates to a surfactant system for inkjet inks for printing on hydrophobic surfaces. Disclosed is an inkjet ink composition comprising an aqueous medium, a colorant comprising a pigment and a polymeric dispersant, and a mixture of surfactants consisting of, inter alia, at least one siloxane surfactant selected from the group consisting of a polyethylene modified siloxane.

US 2003/188665 A1 concerns processes for producing pigment dispersions and ink compositions. It is disclosed that the amount of pigment added is preferably about 1% to 30% by weight. Further, it is disclosed that the amount of dispersant added may be 0.2% to 30% by weight. It is further disclosed that any surfactant commonly added to ink compositions may be utilised.

US 2003/081086 A1 inter alia relates to inkjet inks. An ink is disclosed which comprises water, polyoxyethylene oleylether, C.I. pigment yellow 128 and a block copolymer of AB type having an acid value of 300 and a number average molecular weight of 4000 prepared from benzyl methacrylate and methacrylic acid as starting materials.

The aqueous inkjet inks as known in the art are not well suited for the universal usage in corrugated board printing, especially for in-line printing applications in the corrugator or within the corrugated board production line. The reason for that is that such inkjet inks need to fulfil a very narrowly defined property set in order to show a high printing station availability, in other words, continuous, uninterrupted printing during corrugator operation, and, at the same time, to obtain the required image quality.

Often, the production of images with conventional aqueous inkjet inks according to the state of the art require special surface properties of the paper substrate and therefore often the demanded colour brilliance and/or level of detail that are desired in in-line printing, cannot be achieved. Paper pre-coatings make the printing process more expensive and limits the variety of available paper substrates.

Known aqueous inks show further weaknesses leading to limited technical availability for certain applications, in particular for in-line printing in a corrugator or within the corrugated board production line. Apart from foaming—foam bubbles trapped in the nozzles interrupt the continuous ink flow causing dropouts in the printed image—especially short open-time (start-up) issues of the inks in the nozzles is of upmost importance, resulting in a barrier for the inks' application in single-pass inkjet printers for in-line applications in the corrugator or within the corrugated board production line. The short open-time (start-up) issues are to be understood as delayed ink drop appearance on the substrate after starting ink jetting, causing undefined printed edges and a variation in the colour density until the ink drops ejection becomes regular. This droplet ejection delay takes place on a short time scale (from milliseconds to minutes) and is believed to be related to the dewetting of the nozzle by the ink.

Additionally, state-of-the-art inkjet inks do not show acceptable heat abrasion resistance as required for printed liner and pre-printed liner processing in the corrugator for corrugated board production. The liner, as mentioned above, is to be understood as the outer (either upper or bottom) paper layer in the corrugated board.

Another weakness of the state-of-the-art aqueous inkjet inks is the long-term stability of the physical-chemical properties of the inks, like viscosity, static surface tension and dynamic surface tension, in particular when stored at elevated temperatures for a reasonably long time. This may for example happen during the storage of the inks. Additionally, nowadays recirculating print-heads are typically being used in industrial single-pass printing processes, where high ink amounts are continuously pumped through the print-head and are recirculated in the ink supply system at elevated temperatures. When the state-of-the-art inkjet inks are set to have low static surface tension, e.g. 23-30 mN/m as measured at 25° C., by means of suitable surfactants, such as polyether-modified siloxanes alone or in combination with other non-polysiloxane-based surfactants, gradual increase of the ink surface tension with time is observed leading to the change of the inks' wetting performance on the substrate as well as to instability of the inks. Instability of the inks may cause severe damage of the printer, in particular of the print heads and the ink supply system. The reason for the instability of the desired static surface tension of the ink composition during storage or continuous recirculation is not fully understood but it is believed to be caused either by the poor long-term stability of the modified, in particular polyether modified, polysiloxanes in slightly alkaline, aqueous solutions or by adsorption of the polyether modified polysiloxanes onto the pigment surface and, thus, unavailability of the polysiloxanes as free surfactants for the desired substrate wetting.

On the other hand, poor abrasion resistance of the prints obtained from aqueous inkjet inks in the corrugator prevents these from being used in the in-line digital printing application in the corrugator or within the corrugated board production line due to removal of the applied prints (e.g., primer, coloured ink, transparent ink (varnish) by abrasion) by corrugator parts which may be exposed to elevated temperature environments, like hotplates, in the corrugator causing unacceptable/poor image quality and even worse corrugator stoppage due to blockage.

In particular, there is a need for aqueous inkjet inks that do not suffer from open-time (start-up) issues and which provide long-term stability of ink properties and at the same time guarantee the availability of the inkjet printing unit for in-line operation in a corrugator or within the corrugated board production line with high image quality. Further, there is a need for aqueous inkjet inks that can be processed to prints with improved abrasion resistance, in particular for in-line digital printing applications within a corrugator or within a corrugated board production line. Finally, it is desirable that the aqueous inkjet inks have a low content of volatile organic compounds (VOC)s, such as glycols, polyols and/or glycolethers, other solvents and the like, in order to reduce the VOC-emissions, in particular upon drying of the inks, in the course of manufacture of the decorated corrugated board.

SUMMARY OF THE INVENTION

The present invention provides an aqueous pigment concentrate comprising one or more pigments, wherein the total pigment concentration in the aqueous pigment concentrate is from 5 weight % to 40 weight % (preferably from 10 to 30 wt. % and more preferably from 10 to 20 wt. % and even more preferably from 12 to 18 wt. %), one or more pigment dispersing agents, wherein the total pigment dispersing agent concentration in the aqueous pigment concentrate is from 0.5 weight % to 10 weight % (preferably from 0.5 weight % to 5 weight %, more preferably from 0.75 to 4.5 wt. %, and even more preferably from 1.0 to 4.2 wt. %), one or more non-ionic surfactants with a hydrophilic-lipophilic balance (HLB) value of at least 12 (preferably at least 15 and more preferably at least 17), wherein the total concentration of non-ionic surfactants with a HLB value of at least 12 (preferably at least 15 and more preferably at least 17) in the aqueous pigment concentrate is from 0.1 weight % to 10 weight % (preferably from 0.2 to 7 wt. % and more preferably from 1 to 6 wt. %), and water as balance (i.e. to add up to a total of 100 weight %). Of course, other components (such as pigment wetting agents) may be present in the concentrate.

It is particularly preferred when the ratio of said total non-ionic surfactant concentration to said total pigment dispersing agent concentration is 0.5 to 4.0, preferably 1.0 to 3.0.

The present invention also provides an aqueous ink comprising the inventive aqueous pigment concentrate (in other words: an aqueous ink obtainable by diluting the aqueous pigment concentrate of the present invention preferably with water or an aqueous solution). The aqueous ink most typically comprises an (aqueous) concentrate carrying liquid. Usually, the concentration of the inventive pigment concentrate in the aqueous ink is from 5 to 50 wt. %, preferably from 10 to 30 wt. % and/or the concentration of the pigment concentrate carrying liquid is 50 to 95 wt. %, preferably 70 to 90 wt. %, with the balance being water.

Preferably the aqueous ink (further) comprises (e.g. in a concentrate carrying liquid) one or more film forming agents, wherein the total film forming agent concentration in the aqueous ink is from 0.1 to 30 wt. % (preferably from 0.1 to 20 wt. %, more preferably from 0.1 to 10 wt. %, even more preferably from 0.25 to 7 wt. % and yet more preferably from 0.5 to 5.5 wt. %), and optionally one or more emulsifiers, preferably wherein the total emulsifier concentration in the aqueous ink is from 0.1 to 10 wt. % (preferably from 0.5 to 7 wt % and more preferably from 1 to 5 wt %). The one or more film forming agents preferably fulfil at least one (preferably both) of the following properties: i) a Young modulus of at least 2 GPa, and ii) a nano hardness of at least 0.08 GPa; and/or the one or more emulsifiers, if present, are preferably fatty acid esters of polyalkoxylated sorbitan.

Finally, the invention provides a use of the inventive aqueous ink for inkjet printing, in particular on absorbing substrates, further in particular for printing on corrugated board and/or liner for the production of corrugated board and/or for (in-line) printing in a corrugator or printing within a corrugated board production line.

Surprisingly it has been found by the inventors, that aqueous inkjet inks comprising the inventive pigment concentrate are particularly suitable for the application in single-pass printing on various substrates, in particular absorbing substrates, such as paper, coated paper, liner for the production of corrugated board or corrugated board and that said inks are even suitable for inline printing applications in a corrugator or within the corrugated board production line. It surprisingly turned out that inks comprising the inventive pigment concentrate turned out to have a decreased risk of suffering from open-time (start-up) issues and/or to feature high heat abrasion resistance, long-term stability of the ink under continuous recirculation, and/or at the same time improve the availability of the inkjet printing unit for in-line operation of the corrugator or within the corrugated board production line with high image quality. Further the inventive inks are typically suitable to be processed to prints with improved abrasion resistance, in particular at elevated temperatures (>25° C.), and/or can comprise a reduced amount of VOCs, such as glycols, polyols and/or glycolethers and the like, resulting in reduced VOC emissions, in particular upon drying, surprisingly while retaining other advantageous properties such as described above or in the following. It is another object of the invention to provide an ink, preferably with the properties as described above, with good and stable filtration behaviour, which means that the ink does not cause clogging of the filters within the ink-supply system and the print heads upon continuous operation, in particular upon recirculation and/or printing.

In particular, inks of the present invention do not show any significant ink open-time (start-up) issues when ink jetting is performed with a delay time of at least 1 min, preferably 5 min and more preferably 20 min and even more preferably 40 min.

The aqueous inks of the present invention further have advantageous properties such as reduced foaming and/or have stable physical-chemical properties (such as viscosity, static surface tension and/or dynamic surface tension) over a long time-period when recirculated at elevated temperatures. They are therefore highly suitable for increasing the availability of the inkjet printing unit for in-line operation in a corrugator or within a corrugated board production line.

DETAILED DESCRIPTION OF THE INVENTION

The aqueous pigment concentrate of the present invention is preferably used to manufacture an aqueous ink of the present invention, especially aqueous inkjet inks for inkjet printing applications, in particular (industrial) inkjet printing onto different substrates such as various paper types (coated, non-coated), liner for the production of corrugated boards and corrugated boards. In particular, the inkjet ink of the present invention may be used for (industrial) in-line inkjet printing in a corrugator—the machine for the production of corrugated boards—and/or for printing in an in-line arrangement of an inkjet printing unit and a corrugator. A short description of the corrugated board production in the corrugator can be found at the webpage of the European Federation of Corrugated Board Manufacturers (FEFCO) under the following link: http://www.fefco.org/lca/dscription-of-production-system/corrugated-board-production. Of course, the inks described herein may also be used for off-line printing applications on corrugated board and/or within corrugated board production lines.

Further, the inkjet inks of the present invention may also be used for other digital printing applications, in particular any single-pass or multi-pass inkjet printing process for printing on various, preferably absorbing or porous, substrates, like paper, cardboard, cellulose-based substrates, synthetic fibers and the like.

Within the context of the present invention, aqueous inks are defined as inks comprising more than 30 wt. % of water, preferably more than 60 wt. % of water with respect to the total weight of the aqueous ink.

It is particularly advantageous if the ink of the present invention has a viscosity of more than 3 mPa s, preferably from 3 to 20 mPa s, more preferably from 3.5 to 10 mPa s and even more preferably from 3.5 to 6 mPa s measured at 35° C.

In a preferred embodiment of the present invention, the ink has a viscosity of more than 4 mPa s, preferably from 4 to 15 mPa s and more preferably from 5 to 10 mPa s and even more preferably from 5 to 6 mPa s measured at 35° C.

In a further preferred embodiment, the ink has a static surface tension from 21 to 45 mN/m, more preferably from 23 to 30 mN/m and even more preferably from 25 to 29 mN/m measured at 25° C. and/or a dynamic surface tension from 30 mN/m to 60 mN/m, more preferably from 35 mN/m to 59 mN/m and most preferably from 40 mN/m to 58 mN/m measured at 25° C. at a frequency of 10 Hz.

In a preferred embodiment of the present invention, the ratio of said total non-ionic surfactant concentration to said total pigment dispersing agent concentration (in the pigment concentrate) is from 0.1 to 5, preferably 0.5 to 4.0, more preferably 1.0 to 3.0. The ratio from 0.5 to 4.0 is particularly advantageous because when the ratio of said total non-ionic surfactant concentration to said total pigment dispersing agent concentration is below 0.5, the pigment concentrate viscosity is higher and the pigment concentrate becomes less stable; or in other words, the viscosity of the pigment concentrate at least doubles, or even triples within a week of storage at elevated temperature (e.g. 60° C.) and therefore is less suitable for certain inkjet applications, in particular for corrugated-board-related applications as described herein. In turn, when the ratio of said total non-ionic surfactant concentration to said total pigment dispersing agent concentration is above 4.0, the open-time/start-up behaviour of an ink based on said pigment concentrate is less suitable for certain inkjet applications, in particular for corrugated-board-related applications as described herein.

In yet a further preferred embodiment of the present invention, the ratio of said total non-ionic surfactant concentration to said total pigment dispersing agent concentration (in the pigment concentrate) is from 0.5 to 2.5, yet more preferably 0.5 to 2.0, even more preferably 0.8 to 2.5, yet even more preferably 0.8 to 2.0, more preferably 1.5 to 2.0 and even more preferably 1.7 to 2.0.

In a particularly preferred embodiment of the present invention, the ratio of said total non-ionic surfactant concentration to said total pigment dispersing agent concentration (in the pigment concentrate) is at least 0.5, preferably at least 0.8, more preferably at least 1, more preferably at least 1.5 and more preferably at least 1.7.

In a further preference, the ratio of the sum of said total non-ionic surfactant concentration and said total pigment dispersing agent concentration to said total pigment concentration (in the pigment concentrate) is from 0.10 to 0.80, preferably from 0.25 to 0.65, more preferably from 0.25 to 0.50, and most preferably from 0.25 to 0.40

In a particularly preferred embodiment, the ratio of the sum of said total non-ionic surfactant concentration and said total pigment dispersing agent concentration to said total pigment concentration (in the pigment concentrate) is at least 0.10 and more preferably at least 0.25.

In another embodiment, the one or more pigment dispersing agents comprise (preferably consist of) at least one organic resin or polymer or oligomer, the organic resin or polymer or oligomer having pigment affine groups and/or a weight average molecular weight Mw from 3000 Da to 70000 Da. In particular, the pigment affine groups may be acid groups and/or the resin or polymer or oligomer has an acid value in the range of 5 to 300 mgKOH/g, most preferably in the range of 5 to 250 mgKOH/g.

In yet another embodiment, the one or more pigment dispersing agents (of the pigment concentrate) comprise (preferably consist of) at least one pigment dispersing agent with a glass transition temperature Tg of 20 to 170° C. or with a glass transition temperature Tg of at least 60° C., preferably at least 70° C. and more preferably at least 80° C. This pigment dispersing agent is preferably the organic resin or polymer or oligomer mentioned above. In a further preferred embodiment, the Tg of at least one of the said pigment dispersing agents (of the pigment concentrate) is at least 20° C., preferably at least 70° C., more preferably at least 80° C., yet more preferably at least 90° C. and most preferably at least 100° C.

In another preference, the one or more pigments (of the pigment concentrate) comprise (preferably consist of) at least one organic pigment.

In a further preference, the inventive pigment concentrate further comprises one or more pigment wetting agents, preferably wherein the total pigment wetting agent concentration in the aqueous pigment concentrate is from 3 to 15 wt. %.

According to an embodiment, the aqueous ink (e.g. the pigment concentrate carrying liquid) further comprises one or more polyols (i.e. polyfunctional alcohols) with at least 2 hydroxyl groups and/or one or more glycol ethers, wherein their total concentration in the aqueous ink is from 0.1 to 30 wt. %, preferably 0.1 to 20 wt %, more preferably 1 to 10 wt %, more preferably 1.5 to 8 wt %, more preferably 3 to 7 wt %, even more preferably 3 to 6 wt %, and most preferably 4 to 6 wt %; e.g. 3.1 to 5.8 wt %.

In yet another preferred embodiment, the one or more film forming agents comprise (preferably consist of) one or more film forming agents selected from polyurethanes, polyacrylates, in particular polystyrene-(meth)acrylates or polystyrene (meth)acrylic copolymers, polyesters, polyamide-polyurethanes copolymers, polyurethane-(meth)acrylates, polyamides, and mixtures thereof.

It is particularly preferred when the one or more film forming agents comprise (preferably consist of) one or more film forming agents selected from polyurethanes, polyamide—polyurethane copolymers, polyacrylates, in particular polystyrene (meth)acrylate and/or polystyrene (meth) acrylic copolymer, and mixtures thereof.

In a further preference, the one or more emulsifiers comprise (preferably consist of) at least one emulsifier with an HLB value of at least 12, preferably at least 15 and more preferably at least 17. Alternatively, or in addition thereto, the one or more emulsifiers may comprise (preferably consist of) at least one non-ionic emulsifier, more preferably a poly(alk)oxylated, non-ionic emulsifier and even more preferably a non-ionic, poly(alk)oxylated sorbitan or most preferably a non-ionic, fatty acid ester of poly(alk)oxylated sorbitan or a derivative thereof. Said at least one emulsifier with an HLB value of at least 12 is preferably said at least one non-ionic emulsifier.

In another embodiment of the ink, the weight ratio of the emulsifiers to the film forming agent is from 0.01 to 2.0.

In yet another preferred embodiment, the aqueous ink additionally comprises one or more surfactants, preferably wherein the total surfactant (other than emulsifier) concentration in the aqueous ink is from 0.05 to 5 wt. % (more preferably from 0.1 to 2 wt % even more preferably from 0.1 to 1.5 wt. %, yet more preferably from 0.2 to 1 wt. %, and most preferably from 0.2 to 0.5 wt %). In particular, the one or more surfactants may comprise (preferably consist of) at least one (poly)siloxane surfactant, in particular at least one polyether-modified (poly)siloxane surfactant.

In another embodiment, the aqueous ink has a Brookfield viscosity of more than 3 mPa s, more preferably more than 4 mPa s measured at 35° C., a static surface tension from 21 to 45 mN/m measured at 25° C. and/or a dynamic surface tension from from 30 mN/m to 60 mN/m, more preferably from 35 mN/m to 59 mN/m and most preferably from 40 mN/m to 58 mN/m measured at 25° C. at a frequency of 10 Hz.

In yet another embodiment of the present invention, the aqueous ink further comprises one or more sugar alcohols and/or saccharides, preferably wherein their total concentration in the aqueous ink is from 0.1 to 10 wt. %.

In another embodiment, the aqueous ink further comprises one or more plasticizers, wherein the total plasticizer concentration in the aqueous ink is from 0.1 to 5 wt. %; preferably wherein the one or more plasticizers comprise a polypropylene glycol alkyl phenylether.

Particular features of the present invention are explained in more detail below and may be combined with each other within the context of the invention, as well as with the embodiments set forth above.

Pigment Concentrate

Surprisingly it was found by the inventors that the combination of a non-ionic surfactant with a HLB value of at least 12, preferably at least 15 and more preferably at least 17 in a concentration range from 0.1 to 10 wt. %, and preferably from 0.2 to 7 wt. % and more preferably from 1 to 6 wt. %, even more preferably from 3 to 5 wt %, yet more preferably 3 to 4 wt % and most preferably 3 to 3.8 wt % and a pigment dispersing agent in the concentration range from 0.5 to 5 wt. %, more preferably from 0.75 to 4.5 wt. %, for example 1.75 to 4.5 wt % and even more preferably from 1.0 to 4.2 wt. %, in an aqueous pigment concentrate is particularly advantageous. Preferably, the weight ratio of a non-ionic surfactant with an HLB value at of least 12, preferably at least 15 and more preferably at least 17 to a pigment dispersing agent is from 0.1 to 5, preferably from 0.5 to 4, more preferably from 1 to 3, and/or the weight ratio of the sum of the content of a non-ionic surfactant with high HLB value of at least 12, preferably at least 15 and more preferably at least 17 and the content of a pigment dispersing agent to the pigment is from 0.10 to 0.80, more preferably from 0.25 to 0.65.

In embodiments, it is particularly preferred when the one or more non-ionic surfactants with an HLB value of at least 12 comprise a polyalkoxylated surfactant (or consist of polyalkoxylated surfactants).

In a particularly preferred embodiment the weight ratio of a non-ionic surfactant with an HLB value at of least 12, preferably at least 15 and more preferably at least 17 to a pigment dispersing agent is from 0.5 to 2.5, more preferably 0.5 to 2.0, more preferably 0.8 to 2.5, more preferably 0.8 to 2.0, more preferably 1.5 to 2.0 and even more preferably 1.7 to 2.0, and/or the weight ratio of the sum of the content of a non-ionic surfactant with high HLB value of at least 12, preferably at least 15 and more preferably at least 17 and the content of a pigment dispersing agent to the pigment is from 0.26 to 0.50, more preferably from 0.27 to 0.50, more preferably from 0.28 to 0.50, more preferably from 0.29 to 0.50, even more preferably from 0.29 to 0.45 and most preferably from 0.29 to 0.40.

These non-ionic surfactants with a HLB value at least 12, preferably at least 15 and more preferably at least 17 in combination with a pigment dispersing agent turned out to create an effective organic shell at the pigment surface via specific and non-specific interaction mechanisms, like, van der Waal's forces, hydrogen bonding, dipole-dipole interactions, ion-ion or ion-dipole interactions thereby inhibiting pigment particles to interact with each other leading to a viscosity increase when the pigment concentrate or the ink are stored at elevated temperatures. Without being bound to any particular theory, the mechanism of creation of such effective organic shells at the pigment surface is believed to be as follows: The pigment dispersing agent that may be, for example, a styrene-acrylic resin with pigment affine groups, creates a loose macro network at the pigment surface, where not every available active site of the pigment surface is effectively saturated by the pigment affine groups of the dispersing agent or where the interaction between the surface active sites and the pigment affine groups of the dispersing agent is not sufficiently strong due to steric hindrances. This leads to possibilities for other pigment concentrate components or ink components to have effective exchange at the pigment surface and resulting in desorption of the pigment dispersing agent causing coagulation of pigment particles and thus pigment concentrate and ink instability. The smaller, non-ionic surfactant molecules with a HLB value of at least 12, preferably at least 15 and more preferably at least 17, characterized by high hydrophilicity, effectively attach to the non-occupied active surface sites of the pigment particles inhibiting these sites to be available for intermolecular exchange with other pigment concentrate components or ink components, thus inhibiting dewetting of the pigment particles' surface and therefore assuring higher stability of the pigment concentrates and inventive inks based on inventive pigment concentrates, in particular when being exposed to elevated temperatures.

Furthermore surprisingly such a combination in the pigment concentrate of a non-ionic surfactant with a HLB value of at least 12, preferably at least 15 and more preferably at least 17 in the concentration range from 0.1 to 10 wt. %, and preferably from 0.2 to 7 wt. %, more preferably from 1 to 6 wt. %, even more preferably from 3 to 5 wt %, yet more preferably from 3 to 4 wt % and most preferably from 3 to 3.8 wt % and a pigment dispersing agent in the concentration range from 0.5 to 5 wt. %, more preferably from 0.75 to 4.5 wt. %, for example 1.75 to 4.5 wt % and even more preferably from 1.0 to 4.2 wt. %, wherein preferably the weight ratio of a non-ionic surfactant with high HLB value of at least 12, preferably at least 15 and more preferably at least 17 to a pigment dispersing agent is from 0.1 to 5, more preferably from 0.5 to 4, and more preferably from 1. to 3 and the weight ratio of the sum of the content of a non-ionic surfactant with high HLB value of at least 12, preferably at least 15 and more preferably at least 17 and the content of a pigment dispersing agent to the pigment is from 0.10 to 0.80, preferably from 0.25 to 0.65 effectively reduces any signs of open-time (start-up) issues, especially when ink jetting is performed with the delay time between one and the next drop ejection of at least 1 min, preferably 5 min, more preferably 20 min and even more preferably 40 min.

[High HLB value surfactant] The high HLB value surfactant used for the preparation of the pigment concentrate may also be considered as secondary dispersing agent, as it supports the action of the pigment dispersing agent. Preferred non-ionic surfactants with a HLB value of at least 12, preferably at least 15 and more preferably at least 17 are polyalkoxylated surfactants commercially available under the trade names ZETASPERSE® 179 (HLB=17.9), ZETASPERSE® 182 (HLB 18.2), Surfynol 485 (HLB=17) (all Evonik), Hydropalat WE3135 (HLB=19) (BASF), Hydropalat WE3147 (HLB=18) (BASF), Hydropalat WE3167 (HLB=16) (BASF), Hydropalat WE3320 (HLB=14) (BASF), and mixtures thereof.

[Pigment dispersing agent] The pigment dispersing agent as used for the present invention is preferably an organic resin or polymer or oligomer (resin, polymer and oligomer are used synonymously within the present application) with pigment affine groups, more preferably a styrene-acrylic or stryrene-acrylate resin with pigment affine groups. The organic resin with pigment affine groups preferably has a weight average molecular weight Mw from 3000 to 70000, more preferably from 5000 to 50000 and even more preferably from 10000 to 25000 g/mol. The pigment affine groups may e.g. be chosen from various functional groups that are capable of interacting with pigment particles such as acid (COOH), hydroxyl (OH) and amine (NH2) groups. Preferably, the pigment affine groups are acid groups and preferably the resin has an acid value (AV) in the range of 5 to 300 mgKOH/g, more preferably 5 to 250 mgKOH/g, more preferably from 5 to 100 mgKOH/g, more preferably from 5 to 80 mgKOH/g. In certain embodiments, the pigment affine groups are acid groups and preferably the resin has an acid value (AV) in the range of 40 to 280 mgKOH/g, preferably 60 to 250 mgKOH/g. In a particularly preferred embodiment, the pigment affine groups are acid groups and preferably, the resin has an acid value (AV) of at least 150 mgKOH/g, preferably at least 200 and most preferably at least 220 mgKOH/g.

Preferably, the glass transition temperature Tg of said organic resin with pigment affine groups is 20 to 170° C., more preferably 70 to 130° C. and even more preferably 100 to 120° C. In other embodiments, the Tg of said organic resin with pigment affine groups is at least 20° C., preferably at least 60° C., preferably at least 70° C., preferably at least 80° C., preferably at least 90° C. and more preferably at least 100° C.

Suitable, non-limiting pigment dispersing agents are available under the trade names SOLSPERSE® (The Lubrizol Corporation), JONCRYL® (BASF), EFKA® (BASF), DISPEX ULTRA® (BASF), BYK® (BYK Chemie), DISPERBYK® (BYK Chemie), BYKJET® (BYK Chemie), TEGO DISPERSE® (Evonik).

When the weight average molecular weight Mw of the organic resin with pigment affine groups is below 3000 g/mol, the dispersing ability of the resin generally turned out to be lower and the pigment dispersion generally turned out to be less stable due to particle coagulation/flocculation, and when the Mw of the organic resin with pigment affine groups is above 70000 g/mol the drop formation (drop break off) during ink jetting generally turned out to become less stable.

The acid value of the resin is the measure of the number of carboxylic acid groups in the material. When the acid value of the organic resin with pigment affine groups is lower than 5 mgKOH/g or higher than 300 mgKOH/g the pigment dispersing ability of the organic resin was not as good, generally resulting in lower stability of the dispersed pigments.

In case the glass transition temperature Tg of the organic resin with pigment affine groups is lower than 20° C. there is a higher probability of spontaneous destabilisation of the ink during continuous recirculation through the print-heads with fine filters and channels inside due to softening/adhesion of the resin to the filter membrane either in the ink supply system or in the print head. On the other hand, when the Tg of the organic resin with pigment affine groups is above 170° C. the film formation of the ink layer during drying is more likely to be impaired. However, it was found that it is highly beneficial if the Tg of the organic resin with pigment affine groups is at least 60° C., preferably at least 80° C.

[Pigment] Suitable pigments to be used for the pigment concentrate according to the present application can be of organic or inorganic nature or mixtures thereof. The pigment may be a mixture of different types of pigments to obtain the desired optical appearance. Exemplary inorganic pigments are, e.g., titanium dioxide, silicon dioxide, aluminium dioxide, calcium dioxide, magnesium dioxide, zinc dioxide or mixtures thereof and carbon black, whereas suitable organic pigments may exemplarily be chosen from following classes: phthalocyanine, anthrachinone, perylene, carbazole, monoazo- and bisazobenzimidazolone, isoindolinone, monoazonaphthole, quinacridone, diazopyranthrone, pyrazolone and pyranthrone. Especially preferred are organic pigments chosen from following substance classes: copper phthalocyanine blue pigments, phthalocyanine green pigments, quinacridone pigments, diketopyrrolopyrrol-pigments, dioxazine-based pigments, monoazo-, diazo-, polyazo-, azido-, quinophthalone yellow pigments, carbon black.

Examples of commercially available organic pigments are listed in Colour Index, Volume 1-8, Society of Dyers and Colourists, Yorkshire, England and are to name a few, e.g., pigment blue 1, pigment blue 15, pigment blue 15:1, pigment blue 15:2, pigment blue 15:3, pigment blue 15:4, pigment blue 15:6, pigment blue 16, pigment blue 24, pigment blue 60, pigment brown 5, pigment brown 23, pigment brown 25, pigment yellow 3, pigment yellow 14, pigment yellow 16, pigment yellow 17, pigment yellow 24, pigment yellow 65, pigment yellow 73, pigment yellow 74, pigment yellow 83, pigment yellow 95, pigment yellow 97, pigment yellow 108, pigment yellow 109, pigment yellow 110, pigment yellow 113, pigment yellow 128, pigment yellow 129, pigment yellow 138, pigment yellow 139, pigment yellow 150, pigment yellow 154, pigment yellow 155, pigment yellow 156, pigment yellow 175, pigment green 1, pigment green 7, pigment green 10, pigment green 36, pigment orange 5, pigment orange 15, pigment orange 16, pigment orange 31, pigment orange 34, pigment orange 36, pigment orange 43, pigment orange 48, pigment orange 51, pigment orange 60, pigment orange 61, pigment red 4, pigment red 5, pigment red 7, pigment red 9, pigment red 22, pigment red 23, pigment red 48, pigment red 48:2, pigment red 49, pigment red 112, pigment red 122, pigment red 123, pigment red 149, pigment red 166, pigment red 168, pigment red 170, pigment red 177, pigment red 179, pigment red 190, pigment red 202, pigment red 206, pigment red 207, pigment red 224, pigment red 254, pigment violet 19, pigment violet 23, pigment violet 32, pigment violet 37, pigment violet 42, pigment black 6 and pigment black 7 and Pigment Black PB 7.

Especially preferred examples of commercially available organic pigments are PV Fast Blue BG-NIP (Pigment Blue 15:3, Clariant), Heliogen Blue D 7088 (Pigment Blue 15:3, BASF), Heliogen Blue D 7086 (Pigment Blue 15:3, BASF), Heliogen Blue D 7110 F (Pigment Blue 15:4, BASF), Hostaperm Blue BT 617 D (Pigment Blue 15:4, Clariant), Ink Jet Magenta E 02 (Pigment Red 122, Clariant), Ink Jet Magenta E7B VP 3958 (Pigment Red 122, Clariant), Cinquasia Magenta D 4550 J (Pigment Red 122, BASF), Ink Jet Yellow 4G (Pigment Yellow 155, Clariant), Paliotol® Yellow D 1115 J (Pigment Yellow 155, BASF), Paliotol Yellow D 0960 (Pigment Yellow 138, BASF), Inkjet Magenta E5B 02 (Pigment Violet 19, Clariant), Black pearls 800 Carbon black (Cabot), Monarch 800 Carbon black (Cabot).

[Pigment wetting agent] According to another embodiment of the present invention the pigment concentrate further comprises a pigment wetting agent (i.e. humectant) in the concentration range from 3 to 15 wt. %, and more preferably from 5 to 12 wt. %. The wetting agents are preferably selected from the group of water soluble organic compounds with a boiling point of at least 60° C., more preferably at least 100° C. and even more preferable at least 130° C. (at a pressure of 1 atm), such as polyols, e.g., ethylene glycol, diethyleneglycol, 1,2-propylene glycol, di- and tripropylene glycol, triethylene glycol, tetraethylene glycol, 1,3-propylene glycol, 1,3-butylene glycol, 1,4-butylene glycol, 1,5-pentanediol, 1,2-hexanediol, glycerol and mixtures thereof. The pigment wetting agent(s) effectively pre-wet the surface of the pigments thereby facilitating the attraction of the pigment dispersing agent and the non-ionic surfactant with a HLB value of at least 12, preferably at least 15 and more preferably at least 17.

In case the boiling point of the pigment wetting agent is below 60° C. (at a pressure of 1 atm) there is an increased risk of its substantial loss/evaporation during pigment concentrate production and/or continuous ink recirculation in the ink supply system and/or its evaporation from the ink through the print head nozzles with subsequent nozzle clogging. Therefore, it is preferable for the wetting agent to have a boiling point of at least 60° C. (at a pressure of 1 atm), more preferably at least 100° C. and even more preferably at least 130° C. in order to be more effectively maintained in the pigment concentrate and ink.

[Additives] According to further embodiment of the present invention the pigment concentrate further contains a biocide and/or a defoaming agent. The biocide may be used for effectively suppressing bacterial growth in the pigment concentrate and the corresponding ink and a defoaming agent may be used for decreasing air trapping and foam development in the pigment concentrate and the corresponding ink during action of shear forces while stirring, grinding, filtration, printing, and the like. Further additives such as chelating agents, rheology modifiers, pH control agents (organic and/or inorganic bases, acids), inorganic oxides, salts, etc. as known by a person skilled in the art having the benefit of the present disclosure may also be added to the pigment concentrate.

Ink

According to further aspect of the present invention, an aqueous inkjet ink is provided. This ink is particularly suitable for the application in single-pass and also multi-pass printing on various substrates, in particular absorbing substrates, such as paper, coated paper, liner for the production of corrugated board or corrugated board and even suitable for inline printing applications in a corrugator or within the corrugated board production line. The inks are particularly suitable for single-pass applications.

The inks, in particular comprising an inventive pigment concentrate as described herein, turned out to have a decreased risk of suffering from open-time (start-up) issues and/or to feature high heat abrasion resistance, long-term stability of the ink under continuous recirculation, and/or at the same time guarantee the availability of the inkjet printing unit for in-line operation in the corrugator or within the corrugated board production line with high image quality. Said inks preferably comprise preferably 5 to 50 wt. %, in particular 10 to 30 wt. %, of the inventive pigment concentrate (alternatively, also other, commercially available pigment concentrates may be used) and preferably additionally 50 to 95 wt. %, more preferably 70 to 90 wt. % of a pigment concentrate carrying liquid comprising preferably One or more polyols (=polyfunctional alcohols) with at least 2 hydroxyl groups) and/or glycol ethers in a concentration range from 0.1 to 30 wt. %

One or more film forming agents, in a concentration range from 0.1 to 30 wt. %,

Preferably one or more surfactants, in a concentration range from 0.05 to 5.0 wt. %.

and water as balance.

However, in other embodiments, commercially available pigment concentrates may be used instead of the inventive pigment concentrates as described herein to manufacture the inks according to the present invention. Such commercial pigment concentrates may be for instance self-dispersible pigment dispersions such as available from CABOT (Cab-0-Jet) and pigments with anchored crosslinked dispersants creating a shell around the pigment core available from Fujifilm Imaging Colorants (Pro-Jet Pigment Dispersions).

According to a further embodiment, the ink is free of any pigment and/or pigment concentrate. Such an ink is known as a so-called digital-varnish and may be used as overprint varnish. Such a digital-varnish results in a transparent layer after printing, which is typically used for protection; e.g.: of a previously printed color-print.

In particular, inks of the present invention do not show any significant ink open-time (start-up) issues when ink jetting is performed with a delay time of at least 1 min, preferably 5 min and more preferably 20 min and even more preferably 40 min. This effect may even be achieved with ink formulations comprising a low content of humectants and/or volatile organic compounds (VOCs).

It is particularly advantageous if the ink of the present invention has a viscosity of more than 3 mPa s, preferably more than 4 mPa s, more preferably from 4 to 15 mPa s, yet more preferably from 5 to 10 mPa s and even more preferably from 5 to 6.5 mPa s at 35° C. In certain embodiments, the ink has a viscosity from 3 to 15 mPa s, preferably from 3 to 10 mPa s and more preferably from 3.5 to 6 mPa s measured at 35° C.

Preferably, a static surface tension of the ink ranges from 21 to 45 mN/m, more preferably from 23 to 30 mN/m and even more preferably from 25 to 29 mN/m measured at 25° C. and/or a dynamic surface tension of the ink ranges from 30 mN/m to 60 mN/m, more preferably from 35 mN/m to 59 mN/m and most preferably from 40 mN/m to 58 mN/m measured at 25° C. at a frequency of 10 Hz.

In case the ink viscosity is as described above, such an ink turned out to be more successfully jetted using state of the art industrial print heads, especially suitable for high resolution printing up to 1200 dpi with low native drop size of below 15 pL, more preferably below 10 pL and even more preferably below 7 pL.

The static surface tension of inks determines drop break off from the print head nozzle and ink spreading on the substrate. In case the static surface tension is from 21 to 45 mN/m, more preferably from 23 to 30 mN/m and even more preferably from 25 to 29 mN/m as measured at 25° C., the ink break off from the nozzle orifice having a hydrophobic nature (having ink and/or water repellent property), is substantially facilitated. Furthermore, the ink spreading on the substrate under conditions of single-pass in-line printing on different paper surfaces, especially coated papers, is significantly improved, showing significantly less ink mottling (undesired uneven print density effects and colour variations). Inks with a static surface tension above 45 mN/m as measured at 25° C. show significant mottling issues. Inks with a surface tension below 21 mN/m over-wet the nozzle plates resulting in uncontrolled wetting of the nozzle plate, which imparts the drop formation during printing.

The dynamic surface tension of inks determines the acting-speed of the surfactants used in the ink composition when a new ink surface, like a droplet at the inkjet head, is formed. A dynamic surface tension as specified above, was found beneficial on the bleeding behaviour (undesired flowing of one color into another) of the inks on the substrate, especially on coated papers in a single-pass in-line printing application and thus resulted in improved printing quality. This effect was particularly pronounced in case the static surface tension of the ink was below 30 mN/m. Inks with a dynamic surface tension above 60 mN/m as measured at 25° C. show significant bleeding issues. Inks with a dynamic surface tension below 30 mN/m show uneven print density effects on the substrate. [Humectant] Typically, an aqueous ink, in particular an aqueous inkjet ink comprises liquid humectants, which most often are volatile organic compounds (VOCs), such as solvents, in particular glycols, polyols, glycolethers, polyolethers and the like. These humectants most often are low molecular weight organic compounds, that have a boiling point at ambient temperature (25° C., 1 atm) or above, in particular above the processing temperature of the ink (e.g.: between 30 and 60° C.). Preferably, humectants with a boiling point of at least 100° C., more preferably of at least 120° C. are employed as humectants in order to avoid their evaporation in the course of ink production and processing within the printer. In certain embodiments, the humectants have a boiling point of between 100 and 200° C., preferably between 120 and 180° C. Such humectants may be properly removed in the drying process of the printed ink. Preferably, the humectants have a good solubility in water (i.e. a solubility of more than 10 g/L at 20° C.). The aqueous inks according to the present invention comprise less than 40 wt %, preferably less than 30 wt %, more preferably less than 20 wt %, even more preferably less than 10 wt %, yet more preferably less than 8 wt % and most preferably less than 6 wt % of humectant with respect to the total ink. Inks with less than 20 wt % of humectants are particularly preferred. Polyols, glycols and ethers thereof are used preferably as humectants. A low concentration of humectants is desirable, as thus the VOC emission during the printing process, in particular during the drying process of the inks, may be reduced. However, usually such low humectant concentration may not be achieved in aqueous inks, as such inks suffer severe start-up/open time issues when being jetted, in particular at high printing speeds which are typically required for industrial applications, in particular for applications within a corrugator or a corrugated board production line. Surprisingly, it was found by the inventors, that a very low concentration of humectants (e.g.: below 15 wt %, yet even below 10 wt % and also below 6 wt %) may be achieved in case the aqueous ink comprises at least one or more emulsifiers (preferably wherein the total emulsifier concentration in the aqueous ink is from 0.1 to 10 wt. %), wherein preferably the emulsifier is a non-ionic emulsifier, more preferably a poly(alk)oxylated, non-ionic emulsifier and even more preferably a non-ionic, poly(alk)oxylated sorbitan and most preferably a non-ionic, fatty acid ester of poly(alk)oxylated sorbitan or a derivative thereof. Most preferably, the poly(alk)oxylation of the emulsifier is achieved by polyethoxylation. Non-ionic emulsifiers based on esters of ethoxylated sorbitan with fatty acids, in particular lauryc acid, are particularly preferred. Further, it was found that the start up efficiency for such inks with low humectant concentration may be even further improved, in case the ink additionally comprises one or more surfactants other than above mentioned emulsifier.

These one or more other surfactants may for instance be added via the pigment concentrate or via the pigment concentrate carrying liquid to the ink. These one or more surfactants other than the emulsifier is preferably chosen from the following types of surfactants (Poly)siloxane surfactants,
Alcohol alkoxylate surfactants,
High HLB value surfactants with a HLB value of at least 12,
Acetylene diol surfactants and alkoxylated acetylene diol surfactants,
Fluorinated surfactants, in particular fluorocarbon modified polyacrylate surfactants,
Polymer/(block)copolymer based surfactants, wherein poly(siloxane) surfactants, alcohol alkoxylate surfactants and/or high HLB value surfactants with a HLB value of at least 12 are used preferably.

The concentration of such other surfactant is preferably 0.01 to 5 wt. % with respect to the total ink.

[Polyols/glycols and ethers thereof] Polyols, glycols and ethers thereof are preferably used as humectants. According to an embodiment of the present invention, one or more polyols (=polyfunctional alcohols) with at least 2 hydroxyl groups and/or glycol ethers and/or polyol ethers are present in the ink formulation in a concentration range of 0.1 to 30 wt. %, preferably 0.1 to 20 wt %, more preferably 1 to 10 wt %, even more preferably 1.5 to 8 wt %, yet more preferably 3 to 7 wt %, yet even more preferably 3 to 6 wt %, and most preferably 4 to 6 wt %; e.g. 3.1 to 5.8 wt % and are preferably selected from the group of water soluble organic compounds with a boiling point of at least 120° C. (at a pressure of 1 atm), such as ethylene glycol, diethylene glycol, 1,2-propylene glycol, di- and tripropylene glycol, triethylene glycol, tetraethylene glycol, 1,3-propylene glycol, 1,3-butylene glycol, 1,4-butylene glycol, 1,5-pentanediol, 1,2-hexanediol, glycerol and mixtures and/or ethers thereof. These compounds effectively inhibit water evaporation at the nozzles' orifice therefore reducing the risk of ink drying at the nozzles' orifice reducing nozzle clogging, ink deposition at the nozzles' orifice, formation of the deflected ink drops and printing defects. On the other hand, these compounds increase easy ink resolubility if drying of the ink has happened. However, alternatively to the polyols, glycols, polyol ethers and glycol ethers as described above, other suitable humectants as known in the art may be employed in addition to or alternatively to these compounds.

According to a further embodiment, the inks further comprise one or more sugar alcohols and/or saccharides that are preferably solid or liquid at ambient conditions (25,° C.; 1 atm) and are preferably soluble in water and are preferably present in the ink in a concentration range of 0.1 to 10 wt %, preferably of 0.3 to 3 wt % and most preferably of 0.5 to 2.5 wt %; e.g.: 2 wt %. The preferable sugar alcohols or saccharides are monosaccharides, disaccharides, tri- or polysaccharides, e.g., threitol, erythritol, arabinol, ribitol, xylitol, sorbitol, mannitol, iditol, lyxitol, rabinol, iditol, gulitol, talitol, galactiotol, allitol, alttritol, maltitol, isomaltitol, lactitol, turanitol, derivatives and mixtures thereof. The sugar alcohols and/or saccharides effectively inhibit water evaporation at the nozzles' orifice therefore reducing the risk of ink drying at the nozzles' orifice, reducing nozzle clogging, ink deposition at the nozzles' orifice, formation of deflected ink drops and printing defects. Additionally, sugar alcohols and/or saccharides increase easy ink resolubility if drying of the ink has happened.

[Surfactant] According to a further embodiment of the present invention, the inks further comprise one or more surfactants, preferably in a concentration range from 0.05 to 5 wt. % (more preferably from 0.1 to 2 wt % even more preferably from 0.1 to 1.5 wt. %, yet more preferably from 0.2 to 1 wt. %, and most preferably from 0.2 to 0.5 wt %).

According to a preferred embodiment, the surfactant is or comprises one or more (poly)siloxane surfactants, preferably one or more polyether modified (poly)siloxane surfactants, preferably in a concentration range from 0.05 to 5 wt. %, more preferably from 0.1 to 2 wt % even more preferably from 0.1 to 1.5 wt. %, more preferably from 0.2 to 1 wt. %, yet more preferably from 0.2 to 0.8 wt % and most preferably from 0.2 to 0.5 wt %.

According to a preferred embodiment, the surfactant is or comprises one or more alcohol alkoxylate surfactants, preferably in a concentration range from 0.05 to 5 wt. %, more preferably from 0.1 to 2 wt % even more preferably from 0.1 to 1.5 wt. %, more preferably from 0.2 to 1 wt. %.

According to a further preferred embodiment, the surfactant is or comprises one or more surfactants with a HLB value of at least 12, preferably at least 13, more preferably at least 14, yet more preferably at least 15, even more preferably at least 16 and most preferably at least 17, preferably in a concentration range from 0.05 to 5 wt. %, more preferably from 0.1 to 2 wt % even more preferably from 0.1 to 1.5 wt. %, more preferably from 0.2 to 1 wt. %.

According to a further preferred embodiment, the surfactant is or comprises at least two different (poly)siloxane surfactants, preferably in a concentration range from 0.05 to 5 wt. %, more preferably from 0.1 to 2 wt % even more preferably from 0.1 to 1.5 wt. %, more preferably from 0.2 to 1 wt. %. Preferably at least one, more preferably at least two of these (poly)siloxane surfactants are polyether modified (poly)siloxane surfactants, in particular polyethoxylated poly(siloxane) surfactant. Surprisingly, this combination of surfactants in combination with an emulsifier turned out to be particularly suitable for inks with a low content of humectants as a good wetting of the substrate, low mottling of the ink upon printing and good open time/start up behaviour of the ink could be achieved. Further, such inks showed excellent long-term stability of its static surface tension. A change of static surface tension ($|\sigma_1 - \sigma_{30}|$) of the such inks measured after production ($\sigma_1$) and after storage at 40° C. for 30 days ($\sigma_{30}$) of less than 0.5 mN/m as measured at 25° C. could be realized.

The following surfactants may be used without any limitation to these: acetylene diol surfactants and alkoxylated acetylene diol surfactants (Surfynol 420, Surfynol 440, Surfynol 465, Surfynol 480, Surfynol 61, Surfynol TG, Surfynol AD-01, Surfynol 104, Dynol 360, Dynol 604, Dynol 607, Dynol 800, Dynol 810 all Evonik), fluorinated surfactants (Thetawet FS-8000, Thetawet FS-8050, Thetawet FS-8020 EB, Thetawet FS-8020 DB, all ICT Chemicals; Capstone FS-10, Capstone FS-30, Capstone FS-34, Capstone FS-35, Capstone FS-50, Capstone FS-51, Capstone FS-65, all DuPont), fluorocarbon-modified polyacrylate surfactants (Hydropalat WE 3370, BASF), sulfosuccinate surfactants (Hydropalat WE3475, Hydropalat WE3477, all BASF), polymer based and block copolymer surfactants (Hydropalat WE3111, Hydropalat WE3320, Hydropalat WE3322, Hydropalat WE 3323, all BASF), alkoxylated alcohol surfactants (DYNWET 800N, BYK-LP X 7113, BYK-LP X 23213, all ALTANA), siloxane gemini surfactants (TEGO TWIN 4000, TEGO TWIN 4100, TEGO TWIN 4200, Dynol 960, Dynol 980, all Evonik), alkylphenol alkoxylate surfactants (Triton X-100, Triton X-114, Triton X-405, all DOW Chemicals).

According to a particularly preferred embodiment, one or more polyether modified (poly)siloxane surfactants are used in the concentration range from 0.05 to 2 wt. %, e.g. from 0.1 to 1.2 wt % or from 0.2 to 1.0 wt %, such as 0.8 wt %. These surfactants positively influence the ink behaviour during the printing process, in particular wetting of the interior surface of the nozzle, as well as improve the wetting properties of the ink on the substrate.

In case the polyether modified (poly)siloxane concentration in the aqueous inkjet ink is from 0.05 to 2 wt. %, the static surface tension of ink may be adjusted to 21 to 45 mN/m, more preferably 23 to 30 mN/m and even more preferably 26 to 29 mN/m measured at 25° C.

The following commercially available polyether modified (poly)siloxanes are preferably used without any limitation to these: BYK 345 (ALTANA), BYK 346 (ALTANA), BYK 347 (ALTANA), BYK 348 (ALTANA), BYK 349 (ALTANA), BYK 307 (ALTANA), BYK 333 (ALTANA), BYK-3455 (ALTANA), BYK-LP X 21689 (ALTANA), BYK-LP G 25182, (ALTANA), TEGO WET 240 (EVONIK), TEGO WET 250 (EVONIK), TEGO WET 260 (EVONIK), TEGO WET 265 (EVONIK), TEGO WET 270 (EVONIK), TEGO WET 280 (EVONIK), TEGO WET 500 (EVONIK) Hydropalat WE3220 (BASF), Hydropalat WE3221 (BASF), Hydropalat WE3197 (BASF), Hydropalat WE3650 (BASF) and mixtures thereof.

According to a particularly preferred embodiment, the inks comprise at least one specific polyether modified (poly)siloxane that increases the stability of ink wetting properties. In case at least one such specific polyether modified (poly)siloxane surfactant is used the long term stability of the ink static surface tension may be significantly improved. In case said inks are stored at 40° C. for 1 month the change of the static surface tension (=the difference between the measured value of the static surface tension on the 1st day after production and the measured value of the static surface tension on the 30th day after production when the inks are stored at 40° C.) is not more than +−2.5 mN/m, preferably not more than +−1.5 mN/m as measured at 25° C. The following commercially available polyether modified (poly)siloxanes are preferably used as the specific polyether modified (poly)siloxane surfactant: BYK 348 (ALTANA), BYK 349 (ALTANA), BYK-3455 (ALTANA), BYK-LP G 25182, (ALTANA), Hydropalat WE3220 (BASF), Hydropalat WE3221 (BASF) and mixtures thereof. Without being bound to any particular theory, the nature of the improved stability of the ink surface tension when stored at 40° C. for 1 month is believed to be based on the increased hydrophobicity (due to an increased number of hydrophobic groups) of the specific polyether modified (poly)siloxanes and/or on the reduced number of ethylene oxide groups (see: Peng et al, J Surface Deterg (2010) 13:75-81, DOI 10.1007/s11743-009-1144-4).

According to a further preferable embodiment, the inks comprise a mixture of one or more polyether modified (poly)siloxane surfactants, preferably in the concentration range from 0.05 to 2 wt. %, more preferably from 0.05 to 0.5 wt. %, even more preferably from 0.1 to 0.4 wt. %; e.g.: 0.2 to 1.0 wt %, in particular 0.8 wt %, and one or more alcohol alkoxylate surfactants, preferably in the concentration range from 0.05 to 3 wt. %, more preferably from 0.05 to 1.5 wt. %, and even more preferably from 0.1 to 1 wt. %.

In embodiments of the inks comprising a mixture of one or more polyether modified (poly)siloxane surfactants and one or more alcohol alkoxylate surfactants the static surface tension of the ink as measured at 25° C. from is preferably from 21 to 32 mN/m, more preferably from 23 to 30 mN/m and even more preferably from 26 to 29 mN/m and the change of static surface tension ($|\sigma_1-\sigma_{30}|$) of the ink measured after production ($\sigma_1$) and after storage at 40° C. for 30 days ($\sigma_{30}$) is less than 2.5 mN/m, more preferably, less than 1.5 mN/m, and even more preferably less than 0.5 mN/m as measured at 25° C.

[Film forming agent] The inks further comprise one or more film forming agents, in particular film forming polymers selected from polyurethanes, polyacrylates, in particular polystyrene-(meth)acrylates and/or polystyrene (meth)acrylic copolymers, polyesters, polyamide-polyurethane copolymers, polyamides and/or polyurethane-(meth)acrylates. Said film forming agents are preferably added to the compositions as dispersion (or emulsion; the term polymer dispersion will be used further in the text in order to describe both polymer dispersions or polymer emulsions) in water. The concentration of the film forming agents is preferably from 0.1 to 30 wt. %, more preferably from 0.1 to 20 wt %, even more preferably from 0.1 to 10 wt. %, yet more preferably from 0.25 to 7 wt. % and yet even more preferably from 0.5 to 5.5 wt. % with respect of the total ink. Preferably, the Young modulus of said film forming agent is at least 2 GPa, more preferably at least 3 GPa and/or the nano hardness is at least 0.08, preferably at least 0.1 GPa. The usage of a film forming agent in the ink composition improves the adhesion of the printed layers on the paper surface. Preferable film forming agent dispersions feature a mean particle size of the preferably polymeric particles up to 400-500 nm, more preferably up to 300 nm and even more preferably up to 250 nm. Preferable film forming agents feature a glass transition temperature from −50° C. to 250° C., preferably from −50° C. to 200° C., more preferably from −50° C. to 170° C., even more preferably from 40 to 170° C. and most preferably from 80 to 170° C. In particular preferred embodiments the film forming agent features a glass transition temperature of at least 80° C., more preferably at least 90° C. and most preferably at least 100° C. Without being bound to any particular theory it is believed that a glass transitions temperature of at least 80° C. of the film forming agent leads to a better recirculation behavior of the ink in the printer. Film forming agents with a glass transition temperature of below 80° C. tend to result in deteriorated recirculation behaviour of the ink, as such film forming agent tend to clog the filters within the printer, in particular within the print head by undesired film formation. Further, it was found that film forming agents with a Tg of at least 80° C. lead to a better heat abrasion resistance of the printed ink (=the print) on the substrate, which is particularly important for the inline application of an inkjet unit within a corrugator or within a corrugated board production line.

Furthermore, in case the film forming agent is provided as a dispersion, the film forming agent dispersion should feature suitable filtration characteristics. The suitable filtration characteristics of a polymer dispersion can be assessed as explained in the ink characterization part of the present application.

Inappropriate filtration properties of a polymer dispersion may arise due to an inappropriate particles size or particles size distribution of the polymer dispersion, swelling of the polymer particles in the pigment dispersion carrying liquid, etc.

The film forming agents, in particular the film forming polymers that may be used for the inks may for instance be selected from the groups of polyurethanes, polyacrylates, in particular polystyrene-(meth)acrylates and/or polystyrene (meth)acrylic copolymers, polyesters, polyamide-polyurethane copolymers, polyamides and/or polyurethane-(meth) acrylates polymers and mixtures thereof. Preferably, the film forming agent is added to the ink composition as aqueous dispersion. Exemplary, commercially available film forming agent dispersions are listed in the following:

JONCRYL® 544, JONCRYL® ECO 2117-E, JONCRYL® ECO 2124-E, JONCRYL® ECO 2177-E, JONCRYL® ECO 2189-E, JONCRYL® 538, JONCRYL® 2038, JONCRYL® 8050-E, JONCRYL®8064 (all BASF SE), Eastek® 1000, Eastek® 1100, Eastek® 1200 (all EASTMAN), NeoCryl® A-1131, NeoCryl® A-1127, NeoCryl® BT-24 (all DSM), Takelac®W-6110, Takelac®W-605, Takelac®W-6010, Takelac®W-6061, Takelac®W-5661, Takelac®W-5030, Takelac®WS-6021, Takelac®WS-5000, Takelac®WS-4022, Takelac®WS-5100, Takelac®WS-4000 (all Mitsui Chemicals), Takelac®WPB-341A, Dispurez®101, Dispurez®101A, Dispurez®102, Dispurez®102A, Dispurez®103, Dispurez®201 (all Incorez), Aptalon W8060, Aptalon W8062, Aptalon M8100 (all Lubrizol).

Especially preferred are commercially available film forming agents with a glass transition temperature (Tg) of at least 80° C., e.g. JONCRYL® 90, JONCRYL® 631, JONCRYL® 1158, JONCRYL® 1180, JONCRYL® ECO 2189-E, JONCRYL® 652, JONCRYL® 665, JONCRYL® 667, JONCRYL® 668, JONCRYL®ECO 675, JONCRYL® 678, JONCRYL® 680, JONCRYL® 682, JONCRYL® 8085, JONCRYL® 8078, JONCRYL® 8083, JONCRYL 8082, JONCRYL® 2038, JONCRYL®8060, JONCRYL®8064, JONCRYL®8067, JONCRYL®2157, JONCRYL®8055, JONCRYL®LMV 7051, JONCRYL®LMV 7025, (all BASF SE), NeoCryl® A-662, NeoCryl® A-2091, NeoCryl® BT-101 (all DSM), Takelac®W-605, Takelac®W-6010, Takelac®W-6061, Takelac®W-5030, Takelac®WS-4022, Takelac®WS-5100, Takelac®WS-4000 Takelac®WPB-341, Takelac®WPB-341A (all Mitsui Chemicals), Aptalon W8060, Aptalon W8062, Aptalon M8100 (all Lubrizol).

According to a further preferable embodiment of present invention the usage of a film forming agent comprising one or more particulate (polymer dispersion or polymer emulsion) based on polyurethane, polyurethane-(meth)acrylate, polyamide-polyurethane copolymer, polyacrylate, in particular polystyrene (meth)acrylate and/or polystyrene (meth) acrylic copolymer, in combination with at least one polyether modified (poly)siloxane as surfactant is especially advantageous for excellent stability of the static surface tension of the ink under storage at 40° C. for 1 month (0.1 mN/m<<2.5 mN/m as measured at 25° C.).

According to a further preferable embodiment of present invention high heat abrasion resistance of the ink for the in-line digital printing application in the corrugator or within the corrugated board production line can be achieved when the film forming agent is based on polyamide polyurethane copolymer and/or polyurethane and/or polyacrylate, in particular polystyrene (meth)acrylate and/or polystyrene (meth) acrylic copolymer, preferably with very high hardness and toughness as wells as high abrasion and chemical resistance. Preferably, the glass transition temperature Tg of the polyamide polyurethane and/or polyurethane and/or polyacrylate, in particular polystyrene (meth)acrylate and/or polystyrene (meth)acrylic copolymer, is at least 80° C., more preferably at least 90° C. and most preferably at least 100° C. Preferably, the Young modulus of said polyamide polyurethane and/or polyurethane and/or polyacrylate, in particular polystyrene (meth)acrylate and/or polystyrene (meth) acrylic copolymer, is at least 2 GPa, more preferably at least 3 GPa and/or the nano hardness is at least 0.08, preferably at least 0.1 GPa. Polyamide polyurethanes and/or polyurethanes and/or polyacrylate, in particular polystyrene (meth)acrylate and/or polystyrene (meth)acrylic copolymer, which fulfil at least one of the properties as described above have sufficient hardness and toughness to achieve high heat abrasion resistance. Such compounds are available on the market, for example, under the trade names Takelac WPB-341 (Mitsui Chemicals), Sancure 20041 (Lubrizol), Dispurez 103 (Incorez), Aptalon W8060, Aptalon W8062, Aptalon M8100 (all Lubrizol), to name a few without any limitation.

[Emulsifier] The emulsifier is a special type of surfactant and is to be understood as a surfactant with a low impact on the static surface tension of the ink while improving the solubilisation of the dispersed phase in the ink. In certain embodiments, the emulsifier leads to a change of the static surface tension of the ink of less than 2 mN/m (as measured at 25° C.) at a concentration of 4 wt % (with respect to the total ink) as compared to an ink that is free of any other surfactant or any other emulsifier; in other words, an emulsifier is surfactant with a smaller impact on the static surface tension of the ink as compared to other surfactants, such as (poly)siloxane surfactants. Yet, in other embodiments, the emulsifier leads to a change of the static surface tension of the ink of less than 1 mN/m (as measured at 25° C.) at a concentration of 0.8 wt % (with respect to the total ink) as compared to an ink that is free of any other surfactant or any other emulsifier.

An emulsifier may be present in the ink composition, preferably in a concentration range from 0.1 to 10 wt %, preferably from 1 to 5 wt. % and more preferably from 2 to 4%. According to a further embodiment of the present invention, addition of one or more emulsifiers with a HLB value of at least 12, preferably at least 13 and even more preferably at least 14 to the ink has an advantageous effect on the open time/start-up performance of said ink. The addition of at least one emulsifier as described above turned out to be particularly advantageous in cases where film forming agents based on polyamide polyurethane and/or polyurethane and/or polyacrylate, in particular polystyrene (meth)acrylate and/or polystyrene (meth)acrylic copolymer, were employed. An advantageous effect on the open time/start-up performance of said ink was observed. The weight ratio of the emulsifier(s) to the film forming agent to improve the desired properties is preferably from 0.01 to 2.0, more preferably 0.10 to 1.50 and even more preferably 0.15 to 1.0. Additionally, when said emulsifier is present in the ink formulation, the compatibility and/or solubility of the film forming agents with the ink vehicle is increased, which also ultimately improves the open-time/start up behaviour of the ink. At the same time, or alternatively thereto, the heat abrasion resistance of said inks is improved. Said effect was particularly pronounced in case polyamide polyurethanes and/or polyurethanes and/or polyamides and/or and/or poly (meth)acrylates, in particular polystyrene (meth)acrylates and/or polystyrene (meth)acrylic copolymers, were employed as film forming agents. Also, the emulsifier turned to be highly beneficial, in case an ink formulation with low content of humectants, such as polyols, glycols and ethers thereof is desired as good open-time/start up behaviours of such inks could be achieved, in particular if the emulsifier is an emulsifier as defined in the following.

According to a further preferred embodiment, the emulsifier is a non-ionic emulsifier, more preferably a poly(alk) oxylated, non-ionic emulsifier and even more preferably a non-ionic, poly(alk)oxylated sorbitan and most preferably a non-ionic, fatty acid ester of poly(alk)oxylated sorbitan or a derivative thereof. Non-ionic emulsifiers based on esters of ethoxylated sorbitan with fatty acids are particularly preferred. Commercially available examples of such emulsifiers are Tween 20, Tween 40, Tween 60, Tween 65 and Tween 80 (all MERCK), Lucramul WT 100 (LEVACO). Surprisingly, it was found by the inventors that a combination these emulsifiers with a film forming agent, preferably a polyurethane, a polyamide-polyurethane, a polyacrylate, in particular a polystyrene (meth)acrylates and/or polystyrene (meth) acrylic copolymer and mixtures thereof, was particularly suitable to improve the open time/start-up performance of the ink.

According to the further particular preferable embodiment, the ink comprises at least two, preferably at least three types of the following four types of surfactants:
one or more polyether modified (poly)siloxane surfactants, preferably in a concentration range from 0.05 to 2 wt. %, more preferably from 0.05 to 0.5 wt. %, even more preferably from 0.1 to 0.4 wt. %; e.g.: 0.2 to 1.0 wt %, in particular 0.8 wt %,
one or more alcohol alkoxylate surfactants, preferably in a concentration range from 0.05 to 3 wt. %, more preferably from 0.05 to 1.5 wt. %, and even more preferably from 0.1 to 1 wt. %.
one or more emulsifiers, preferably in a concentration range from 0.1 to 10 wt %, preferably from 1 to 5 wt. % and more preferably from 2 to 4%, wherein preferably the emulsifier is a non-ionic emulsifier, more preferably a non-ionic, poly(alk)oxylated sorbitan and most preferably a non-ionic, fatty acid ester of poly (alk)oxylated sorbitan or a derivative thereof.
one or more non-ionic surfactants other than the emulsifier with a HLB value of at least 12, wherein the total concentration of such surfactant in the aqueous ink is from 0.01 to 5 wt. %, wherein preferably such surfactant is poly(alk)oxylated surfactant.

According to a particularly preferred embodiment, the ink comprises:
one or more polyether modified (poly)siloxane surfactants, preferably in a concentration range from 0.05 to 2 wt. %, more preferably from 0.05 to 0.5 wt. %, even more preferably from 0.1 to 0.4 wt. %; e.g.: 0.2 to 1.0 wt %, in particular 0.8 wt %,
one or more emulsifiers, preferably in a concentration range from 0.1 to 10 wt %, preferably from 1 to 5 wt. % and more preferably from 2 to 4%, wherein preferably the emulsifier is a non-ionic emulsifier, more preferably more preferably a non-ionic, poly(alk)oxylated sorbitan and most preferably a non-ionic, fatty acid ester of poly(alk)oxylated sorbitan or a derivative thereof.
one or more non-ionic surfactants other than the emulsifier with a HLB value of at least 12, wherein the total concentration of such surfactant in the aqueous ink is from 0.01 to 5 wt. %, wherein preferably such surfactant is a poly(alk)oxylated surfactant.

[Plasticizer] According to a preferred embodiment, the ink according to the present invention further contains one or more plasticizers, preferably in concentration from 0.1 to 5 wt %, preferably from 0.5 to 4 wt %, more preferably from 0.8 to 3 wt % and most preferably from 1.2 to 2.5 wt %, e.g. 2 wt % with respect to the total weight of the ink. Preferably, said one or more plasticizer comprises a polypropylene glycol alkylphenylether based plasticizer. The plasticizer may improve the printability and/or the start up effect of the ink. Commercially available examples of suitable plasticizers are Loxanol PL 5060 (BASF)—polypropylene glycol alkylphenylether; 2-phenoxyethanol (MERCK); Loxanol CA5086 (BASF), Loxanol CA5310 (BASF); Loxanol OT 5840 (BASF).

[Additives] Inks according to the present invention may further comprise biocides for effective suppressing of bacterial growth, defoaming agents for suppressing of air trapping and foam development, rheology agents, for example thickening agents for adjusting the ink viscosity to the desired viscosity level, as different industrial print-heads are operating within a specified ink physical properties window, chelating agents, adhesion promoters, solvents and other additives as known by a person skilled in the art upon having the benefit of the present disclosure.

In contrast to aqueous inkjet inks according to the state of the art, which are known to cause complications like open-time/start-up issues, permanent or temporary nozzle drop out caused by air trapping in the nozzle due to ink foaming or ink drying at the nozzle orifice, poor image quality and low image density, inks according to the present application reduce these particular issues. This allows the usage of disclosed aqueous inkjet ink formulations even in high-end single-pass printing applications at high printing speeds of up to 300-450 m/min, more preferably 300-400 m/min and in inline printing applications in a corrugator or within a corrugated board production line.

Ink Characterization

[Open time (start-up) behaviour] The image file to observe the effect on open time/start up behaviour of the ink should be chosen as follows:

An image with a low optical density of color visualizes the effect stronger than one with higher optical density. For that test an image with 10% optical density is preferred. 100% refers to an image where all nozzles are jetting at every pulse of the set waveform, whereas 10% means that only 1 out of 10 pulses is used for jetting (so the complete amount of ink (or drops) is also ¹/₁₀). The amplitude of the wave is set to reach a drop-size of 8 pL preferably, which can be checked by printing a defined amount of drops, weighing the printed fluid, and calculating the mass for a single drop.

The open time/start up behaviour is judged by the following test:

An image is printed with 10% optical density and the printer is left idle for specified period of time (1, 5, 10, 20, 40 min) without applying pulses to the piezo head or purging ink through the head. After this specified idle time, an image is printed with 10% optical density again. The very first printed lines of the second image are then compared with the very last printed lines of the first image (printed before the specified idle time).

An ink without visible open time/start up issues has no visual difference (either by eye or pocket microscope with 10 times magnification) between the two images relating to the edge sharpness and/or density in the first lines of drops, as well as on the rest of the image, the open time is considered as good.

If there is a significant visual difference between the first and second image, in particular between the very last lines of the first image and the very first lines of the second image, the open time is considered as poor. Such a significant visual difference may be for example:

the first lines of drops are missing or appearing with delay on the second image printed after the specified idle time and/or the position of the first lines of drops of the second image deviates from their position on the first image before the specified idle time, resulting in deviated drop positioning and/or the optical density of the second image decreases/changes as compared to the first image and/or the second image is only partially printed or not even printed at all.

The open time/start-up behaviour is reported by the following gradation: 1 (very poor), 2 (poor), 3 (OK), 4 (good), 5 (very good):

| Idle time until appearance of significant visual difference(s) between the first and second image | Gradation |
|---|---|
| <1 min | 1 |
| <5 min | 2 |
| <10 min | 3 |
| <20 min | 4 |
| ≥20 min | 5 |

[Viscosity] The ink viscosity is determined at 35° C. (mimics the operating temperature of common industrial printers) by rotational viscometer Brookfield DV2T extra with UL adapter equipped with water jacket for precise ink temperature control connected with the forced temperature control bath.

[Nano hardness/Young modulus] The nano hardness as well as the Young modulus of a film forming agent were determined by nano indentation measurements. The measurements were performed using a MTS Nanoindenter XP based on DIN ISO 14577-1 (202), in particular version 2015-11, at room temperature (25° C.) using an indentation depth controlled method (indentation depth maximum 10% of the film thickness but not more than 3 μm)).

Sample preparation: A mixture of the film forming agent dispersion (7.5-9 ml) with monoethylene glycol (1 ml) as coalescent agent and optionally distilled water (0-1.5 ml) and one drop of wetting agent BYK 349 were mixed thoroughly in a container for 20 min. The concentration of the film forming agent was chosen to obtain a concentration of 28-35 wt. % of the film forming agent in the final mixture.

For example: In case a film forming agent that is supplied as aqueous dispersion with 48 wt. % of the film forming agent, 8 g of the film forming agent aqueous dispersion was mixed with 1 g of monoethylene glycol and 1 g of water and 1 drop of BYK 349. This final mixture has a concentration of 38.4 wt. % of film forming agent. By applying a 80 μm wet film layer, a dry film with a thickness of approximately 31 μm will be formed (80×0,384=30,72≈31 μm).

Glass plates of 2 mm thickness were cleaned with soap solution and flushed with isopropyl alcohol. Then a coating of the film forming agent was applied onto the prepared glass plate by draw-down technique using a film applicator with a wet film thickness of 80-120 μm. Subsequently the wet samples were transferred into a drying oven for film forming at 130° C. for 15 min. The drying oven has to be levelled in order to guarantee a uniform wet film spreading over the substrate.

After drying and cooling of the glass plates of at least 16 hrs the test specimens (2 cm×2 cm) were cut using a glass cutter and subjected to the nano indentation measurements.

[Glass transition temperature (Tg)] The glass transition temperature (Tg) of a material is determined by differential scanning calorimetry (DSC) measurements with a heating and cooling rate of 20 K/min.

[Acid value (AV)] The acid value (AV) is determined according to ONORM EN ISO 2114: 2002 05 01, yet with the difference that a mixture of 28 parts by weight of acetone and 1 part by weight of pyridine is used as solvent.

[Weight average molecular weight (Mw)] The weight average molecular weight (Mw) is determined by gel permeation chromatography. As an eluent, chloroform (for (semi)crystalline compounds) or tetrahydrofurane (THF) (for amorphous compounds) is used, at a flow rate of 1 ml/min. Calibration of the separation columns (three columns of 8 mm×300 mm each, PSS SDV, 5 pm, 100, 1000 and 100000 A) was done by narrowly distributed polystyrene standards, and detection via refractive index detector

[Static surface tension] The static surface tension is determined at 25° C. using a KRÜSS Processor-Tensiometer K100MK2 and a plate method, in particular according to DIN-EN-14370-2004-11.

[Long-term stability of ink physical-chemical properties] In order to monitor the long-term stability of the ink's physical-chemical properties, the ink samples are stored in a drying cabinet at 40° C. for 30 days and the viscosity (measured at 35° C.) and static surface tension (measured at 25° C.) of the ink sample is being measured right after production and after 30 days. $\sigma_1$—corresponds to the ink static surface tension after production and $\sigma_{30}$—to the ink static surface tension after storage at 40° C. for 30 days.

[Dynamic surface tension] The dynamic surface tension is determined at 25° C. at a frequency of 10 Hz using a Sita Science Line T100 laboratory tensiometer by using a bubble pressure method. The measurement of ink dynamic surface tension was carried out in a bubble lifetime range starting from 15 ms up to 6000 ms.

[Film forming agent filtration characteristic] Method 1: The filtration characteristics were evaluated as follows: 60 mL of a film forming agent based composition comprising the film forming agent of interest at its concentration in the ink, one or more polyols at their concentration in the ink and water as balance were filled into a 60 mL syringe (Terumo 60 CC, Luer lock Tip) and a 1 micrometer glass fiber disc filter (PureFlo 25 mm disc filter, D25CG010LMLF, Saint Gobain) was connected over the male Luer lock inlet to the syringe comprising said composition. The composition was pressed manually through the filter at room temperature (25° C.) without significant force applied. In case a film forming agent displays suitable filtration characteristics, the testing composition as described above will completely (>90%) pass through the filter without any blocking of said filter. An unsuitable/inappropriate film forming agent will be characterized in fast blocking of the filter (<20% throughput). A film forming agent of intermediate suitability will only partially pass through the filter (20-90%) before the filter gets blocked.

Method 2: The filtration characteristics were evaluated as follows: 400 mL of a film forming agent based composition comprising the film forming agent of interest at 4% solids, one or more polyols at their concentration in the ink and water as balance were filled into a 100 mL syringe (BD Plastipac 100 CC, Luer lock Tip) and a 1 micrometer glass fiber disc filter (PureFlo 25 mm disc filter, D25CG010LMLF, Saint Gobain) was connected over the Male Luer Lock inlet to the syringe comprising said composition. The composition was pressed manually through the filter at room temperature (25° C.) without significant force applied. The procedure was continued until either all the composition was filtered or the filter got blocked. In case a film forming agent displays excellent filtration characteristics, the testing composition as described above will to a large extent (>70%) pass through the filter said filter. An unsuitable/inappropriate film forming agent with poor filtration characteristics will be characterized in fast blocking of the filter (<20% throughput). A film forming agent of intermediate suitability with good filtration characteristics will partially pass through the filter (20-70% throughput) before the filter gets blocked.

In principle both Method 1 and Method 2 may be employed to determine the filtration characteristics of a film forming agent, but Method 2 is being used preferably as due to the higher amount of test liquid (60 mL in Method 1 vs 400 mL in Method 2) the different filtration characteristics of the film forming agents become more evident and may be better assessed.

[HLB value] Herein, the term "HLB value" relates to the HLB value calculated according to the method of Griffin, as e.g. set forth in Griffin, William C. "Classification of surface-active agents by" HLB". "J. Soc. Cosmet. Chem. 1 (1949): 311-326.

Manufacture

[Pigment concentrate] In a preferred embodiment, the pigment concentrate as described herein is produced by bringing together the corresponding materials via mixing, blending, stirring or other methods suitable for producing homogenous mixtures followed by wet milling of the mixture for pigment de-agglomeration, dispersing, grinding and stabilization via action of the pigment dispersing agent and the non-ionic surfactant with high HLB value of at least 12, preferably at least 15 and more preferably at least 17 by using zirconia beads of suitable diameter (0.1-1.0 mm). However, also other methods as known the art may be employed to manufacture the pigment concentrate as described herein.

[Ink] In a preferred embodiment, the aqueous inkjet inks of the present invention are produced by bringing together the corresponding materials via mixing, blending, stirring, milling and other methods suitable for producing homogenous mixtures. First, the compounds of the pigment concentrate carrying liquid are blended together for a short time (e.g. 30 min) in a container and then the corresponding amount of pigment concentrate is added slowly under continuous stirring in order to prevent a so called pigment shock (destabilisation of the pigment concentrate leading to the appearance of coarse particles in the ink). After addition of pigment concentrate the mixture is stirred for 1 hour and then filtered through depth filters with different mesh sizes (e.g. 5.0 to 1.0, 0.8, 0.5 μm) as known by a person skilled in the art.

Printing

The ready made ink formulation can then be applied not only by using multi-pass inkjet printers but especially also by using single-pass inkjet printers onto paper or coated paper substrates followed by drying of the ink using infra-red (short infra-red, middle infra-red or far infra-red) irradiation and/or convection drying for removal of volatile parts of the ink. The said inks can also be successfully digitally applied onto the surface of other substrates than paper or coated paper followed by drying of the ink using infra-red (short infra-red, middle infra-red or far infra-red) irradiation and/or convection drying for removal of volatile parts of the ink.

The said ink can also be successfully applied onto the surface of any before mentioned substrate which may be pre-coated, pre-modified, pre-treated with a solution, mixture, and/or dispersion, physically pre-treated with corona discharge and/or plasma pre-treated and/or flamed. The pre-treatment solutions, mixtures, dispersions are controlling the ink spreading and absorption on the substrate surface and are known in the art. Typically, these comprise substances such as polyvalent cations, oxides and/or salts (with organic or inorganic anions) of polyvalent metals and/or non-metals, polymeric compounds with high charge density like polymeric polyamine, polyethylene imine and/or cationic flocculating compounds without any limitation to these compounds.

The inventive ink can also be successfully applied onto the surface of any before mentioned substrate which may be pre-coated, pre-modified, pre-treated with a solution, mixture and/or dispersion, physically pre-treated with corona discharge and/or plasma pre-treated and/or flamed and then be further over coated, over printed, digitally or analogously by a digital or an analogous overprint varnish, which may be an inventive ink, for improved water fastness, rub fastness, heat abrasion resistance, increased gloss or matt finish effects, partial coverage with said digital or analogue overprint varnish for highlighting selected image areas and the like. The analogue process is the application of the coating by means of roller coater, screen printing, flexo printing, gravure printing, offset printing, etc.

Further Embodiments of the Invention

The present invention further relates to the following embodiments:

Embodiment 1. Aqueous pigment concentrate comprising
one or more pigments, wherein the total pigment concentration in the aqueous pigment concentrate is from 5 to 40 wt. %, preferably wherein the one or more pigments comprise an organic pigment,
one or more pigment dispersing agents, wherein the total pigment dispersing agent concentration in the aqueous pigment concentrate is from 0.5 to 5 wt. %,
one or more non-ionic surfactants with a hydrophilic-lipophilic balance (HLB) value of at least 12, wherein the total concentration of non-ionic surfactants with an HLB value of at least 12 in the aqueous pigment concentrate is from 0.1 to 10 wt. %, and
water as balance;
preferably wherein the ratio of said total non-ionic surfactant concentration to said total pigment dispersing agent concentration is from 0.1 to 5 and/or preferably wherein the ratio of the sum of said total non-ionic surfactant concentration and said total pigment dispersing agent concentration to said total pigment concentration is from 0.10 to 0.80, preferably from 0.25 to 0.65.

Embodiment 2. Aqueous pigment concentrate according to embodiment 1, characterised in that the one or more pigment dispersing agents comprise an organic polymer, the organic polymer having pigment affine groups and a weight average molecular weight Mw from 3000 Da to 70000 Da; preferably wherein the pigment affine groups are acid groups, especially wherein the polymer has an acid value in the range of 5 to 300 mgKOH/g.

Embodiment 3. Aqueous pigment concentrate according to embodiments 1 or 2, characterised in that the one or more pigment dispersing agents comprise a pigment dispersing agent with a glass transition temperature Tg of 20 to 170° C.

Embodiment 4. Aqueous pigment concentrate according to any of the preceding embodiments, characterised in that the concentrate further comprises one or more pigment wetting agents, wherein the total pigment wetting agent concentration in the aqueous pigment concentrate is from 3 to 15 wt. %.

Embodiment 5. Aqueous ink comprising the aqueous pigment concentrate according to any of the preceding embodiments.

Embodiment 6. Aqueous ink according to embodiment 5, further comprising a pigment concentrate carrying liquid, wherein the aqueous ink comprises
one or more film forming agents, wherein the total film forming agent concentration in the aqueous ink is from 0.1 to 10 wt. %, and
one or more emulsifiers, wherein the total emulsifier concentration in the aqueous ink is from 0.1 to 10 wt. %;
wherein the one or more film forming agents fulfil at least one of the following properties:
i) a Young modulus of at least 2 GPa, and
ii) a nano hardness of at least 0.08 GPa;
preferably wherein the weight ratio of the one or more emulsifiers to the one or more film forming agents is from 0.01 to 2.0.

Embodiment 7. Aqueous ink according to any of the preceding embodiments, characterised in that the pigment concentrate carrying liquid further comprises one or more polyols with at least 2 hydroxyl groups and/or one or more glycol ethers, wherein their total concentration in the aqueous ink is from 0.1 to 30 wt. %.

Embodiment 8. Aqueous ink according to any of the preceding embodiments, characterised in that the one or more film forming agents comprise one or more film forming agents selected from polyurethanes, polyacrylates, in particular polystyrene-(meth)acrylates or polystyrene (meth)acrylic copolymers, polyesters, polyamide-polyurethane copolymers, polyurethane-(meth)acrylates, polyamides and mixtures thereof; preferably wherein the one or more film forming agents comprise one or more film forming agents selected from polyurethanes, polyamide—polyurethane copolymers, polyacrylates, in particular polystyrene-(meth)acrylates or polystyrene (meth)acrylic copolymers, and mixtures thereof.

Embodiment 9. Aqueous ink according to any of the preceding embodiments, characterised in that the one or more emulsifiers comprise an emulsifier with an HLB value of at least 12 and/or one or more non-ionic emulsifiers, more preferably one or more polyoxylated, non-ionic emulsifiers and even more preferably one or more non-ionic, fatty acids ester of polyoxylated sorbitan emulsifiers.

Embodiment 10. Aqueous ink according to any of the preceding embodiments, characterised in that the aqueous ink additionally comprises one or more surfactants, wherein the total surfactant concentration in the aqueous ink is from 0.05 to 5 wt. %, preferably wherein the one or more surfactants comprise a polysiloxane surfactant, especially a polyether-modified polysiloxane surfactant; and/or wherein the aqueous ink further comprises one or more sugar alcohols and/or saccharides, wherein their total concentration in the aqueous ink is from 0.1 to 10 wt. %.

Embodiment 11. Aqueous ink according to any of the preceding embodiments, characterised in that the aqueous ink has a Brookfield viscosity of more than 4 mPa s measured at 35° C. and/or a static surface tension from 21 to 45 mN/m measured at 25° C.

Embodiment 12. Aqueous ink according to any of the preceding embodiments, characterised in that the aqueous ink further comprises one or more plasticizers, wherein the total plasticizer concentration in the aqueous ink is from 0.1 to 5 wt. %; preferably wherein the one or more plasticizers comprise a polypropylene glycol alkylphenylether.

Embodiment 13. Use of the aqueous ink according to any of embodiments 5 to 12 for inkjet printing.

Embodiment 14. Use of embodiment 13, for printing on a corrugated board or on a liner for the production of corrugated board.

Embodiment 15. Use of embodiment 13 or 14, for printing in a corrugator or for printing within a corrugated board production line, preferably wherein said printing occurs in-line.

EXAMPLES

The following further examples are provided to further illustrate the invention and its benefits without any intention of limitation. A commercially available SAMBA print head available from FUJIFILM Dimatrix was used for the printing tests. The printed ink was dried at 120° C. for 15 minutes in a convection oven.

Table 1 Pigment concentrates—quantities are given as wt % with respect to the total weight of the pigment concentrate. Examples B1 to B3 represent inventive pigment concentrates, whereas examples V1 to V4 represent comparative pigment concentrates.

Table 2 Inks—quantities are given as wt. % with respect to the total weight of the ink Examples Ink 1 to Ink 10 represent inventive inks, whereas examples Comp Ex.1 and Comp. Ex 2 represent comparative inks.

Table 3 Recirculability of inks comprising different film forming agents and filtration characteristics of the respective film forming agents.

Tables 1 to 3 are shown below.

TABLE 1

| Raw material | Manufacturer | Short description | B1 | B2 | B3 | V1 | V2 | V3 | V4 | V5 | V6 |
|---|---|---|---|---|---|---|---|---|---|---|---|
| Joncryl 8082 | BASF SE | Pigment dispersing agent | 1.60 | 2.54 | 2.03 | — | — | 0.87 | 0.87 | 1.75 | 1.75 |
| Zetasperse 179 | Evonik | Non-ionic surfactant; HLB = 17.9 | 4 | 3.75 | 3 | 6 | — | — | — | 7.25 | 0.60 |
| Tego Disperse 760W | Evonik | Pigment dispersing agent | — | — | — | — | 4.2 | 3.5 | 3.5 | — | — |
| BYK 019 | ALTANA | Defoaming agent | 0.3 | 0.3 | 0.3 | 0.3 | 0.3 | 0.3 | 0.3 | 0.3 | 0.3 |
| 1,2-propylene glycol | Merck | Pigment wetting agent (=humectant) | 8 | 8 | 8 | 8 | 8 | 8 | 8 | 8 | 8 |
| Acticide B20 | Thor | Biocide | 0.05 | 0.05 | 0.05 | 0.05 | 0.05 | 0.05 | 0.05 | 0.05 | 0.05 |
| Clariant Inkjet Yellow 4G | Clariant | Pigment | 20 | — | — | — | — | — | — | — | — |
| PV Fast Blue BG-NIP | Clariant | Pigment | — | 20 | — | — | — | — | — | — | — |
| Clariant Magenta E02 | Clariant | Pigment | — | — | 20 | 20 | 20 | 20 | 20 | 20 | 20 |
| Humectant GRB2 | Lubrizol | Pigment wetting agent (=humectant) | — | — | — | — | — | — | 4 | — | — |
| Water | | | balance | balance | balance | balance | balance | balance | balance | balance | balance |
| Stability at 60° C. for 4 weeks | | | stable | stable | stable | stable | stable | stable | stable | unstable | stable |

TABLE 2

| Raw Material | Manufacturer | Short description | Ink 1 | Ink 2 | Ink 3 | Ink 4 | Ink 5 | Ink 6 | Ink 7 | Ink 8 | Ink 9 | Ink 10 | Ink 11 | Comp. Ex. 1 | Comp. Ex. 2 | Comp. Ex. 3 | Comp. Ex. 4 |
|---|---|---|---|---|---|---|---|---|---|---|---|---|---|---|---|---|---|
| B1 | | Pigment concentrate | 21 | — | — | — | — | — | — | — | — | — | — | — | — | — | — |
| B2 | | Pigment concentrate | — | 23 | — | — | 21 | 21 | 21 | 21 | 18 | 18 | 18 | — | — | — | — |
| B3 | | Pigment concentrate | — | — | 21 | 21 | — | — | — | — | — | — | — | — | — | — | 18 |
| V2 | | Pigment concentrate | — | — | — | — | — | — | — | — | — | — | — | 24 | — | — | — |
| V4 | | Pigment concentrate | — | — | — | — | — | — | — | — | — | — | — | — | 24 | — | — |
| V6 | | Pigment concentrate | — | — | — | — | — | — | — | — | — | — | — | — | — | 21 | — |
| Takelac W-5661 | Mitsui Chemicals | Film forming agent (polyether polyurethane dispersion) (Tg = 70° C.) | 0.88 | 0.88 | 0.88 | 0.88 | 0.88 | — | — | — | — | — | — | — | — | — | — |
| Joncryl 8050E | BASF | Film forming agent (acrylic emulsion) Nano hardness: 0.04 GPa Tg = −18° C. Young Modulus: 1.9 GPa | — | — | — | — | — | — | — | — | — | — | — | 1.2 | — | — | — |
| Joncryl 8064 | BASF | Film forming agent (styrene-acrylic emulsion) Nano hardness: 0.24 GPa Young Modulus: 5.6 GPa Tg = 97° C. | — | — | — | — | — | — | — | — | — | — | — | — | 1.09 | 1.09 | — |

TABLE 2-continued

| Raw Material | Manufacturer | Short description | Ink 1 | Ink 2 | Ink 3 | Ink 4 | Ink 5 | Ink 6 | Ink 7 | Ink 8 | Ink 9 | Ink 10 | Ink 11 | Comp. Ex. 1 | Comp. Ex. 2 | Comp. Ex. 3 | Comp. Ex. 4 |
|---|---|---|---|---|---|---|---|---|---|---|---|---|---|---|---|---|---|
| Aptalon W8060 | Lubrizol | Film forming agent (polyamide-polyurethane) Nano hardness: 0.13 GPa Young Modulus: 5.3 GPa | — | — | — | — | — | 3.6 | 5.4 | 3.6 | — | — | — | — | — | — | — |
| Experimental high Tg Styrene-acrylic polymer | | Film forming agent (styrene-acrylic emulsion) Tg = 165° C. Nano hardness: 0.25 GPa Young Modulus: 14.8 GPa | | | | | | | | | 4.0 | 4.0 | 4.0 | | | | |
| Joncryl 538 | BASF | Film forming agent (acrylic emulsion) Tg = 64° C. Nano hardness: 0.27 GPa Young modulus: 8.23 GPa | | | | | | | | | | | | | | | 4.65 |
| 1,3-Butanediol | MERCK | Polyol | 10 | 10 | 10 | 10 | 10 | — | — | — | — | — | 4 | 10 | 10 | 10 | 4 |
| Diethyleneglycol | MERCK | Polyol | — | — | — | — | — | — | — | — | — | — | — | 9.5 | 9.5 | — | — |
| 1,2-Propanediol | MERCK | Polyol | 9 | 9 | 9 | 9 | 9 | — | — | — | — | — | — | — | — | 9 | — |
| Glycerol | MERCK | Polyol | — | — | — | — | — | 4 | 5 | 4 | 4 | 4 | — | — | — | — | — |
| Tween 80 | MERCK | Emulsifier | — | — | — | — | — | 3.0 | — | 3.0 | 3.0 | 3.0 | 3.0 | — | — | — | 4 |
| Tween 40 | MERCK | Emulsifier | — | — | — | — | — | — | 2.0 | — | — | — | — | — | — | — | — |
| Loxanol PL 5060 | BASF | Plastiziser | — | — | — | — | — | — | — | — | — | 2.0 | — | — | — | — | — |
| Maltitol | MERCK | Polyol, sugar alcohol/saccharide | 4.05 | 4.05 | 4.05 | 4.05 | 4.05 | 1.00 | 1.00 | — | 1.00 | 1.00 | 1.00 | 4.05 | 4.05 | 4.05 | 1.00 |
| Sorbitol | MERCK | Polyol, sugar alcohol/saccharide | 0.30 | 0.30 | 0.30 | 0.3 | 0.30 | 0.10 | 0.10 | — | 0.1 | 0.1 | 0.1 | 0.30 | 0.30 | 0.30 | 0.1 |

TABLE 2-continued

| Raw Material | Manufacturer | Short description | Ink 1 | Ink 2 | Ink 3 | Ink 4 | Ink 5 | Ink 6 | Ink 7 | Ink 8 | Ink 9 | Ink 10 | Ink 11 | Comp. Ex. 1 | Comp. Ex. 2 | Comp. Ex. 3 | Comp. Ex. 4 |
|---|---|---|---|---|---|---|---|---|---|---|---|---|---|---|---|---|---|
| DP3H and >DP3H* | Roquette | Polyol | 3.30 | 3.30 | 3.30 | 3.30 | 3.30 | 3.30 | 3.30 | — | 3.30 | 3.30 | 3.30 | 3.30 | 3.30 | 3.30 | 3.30 |  | ALTANA | Rheology additive | 0.14 | 0.13 | 0.15 | 0.19 | 0.16 | 0.25 | 0.15 | 0.25 | 0.29 | 0.29 | 0.29 | 0.06 | 0.25 | 0.14 | 0.25 |
| BYK LP-R 21675 | ALTANA | Rheology additive | 0.14 | 0.13 | 0.15 | 0.19 | 0.16 | 0.25 | 0.15 | 0.25 | 0.29 | 0.29 | 0.29 | 0.06 | 0.25 | 0.14 | 0.25 |
| DYN WET 800N | Altana | Non-ionic surfactant (alcohol alkoxylate); HLB = 8 | — | — | — | 1.0 | — | — | — | — | — | — | — | — | — | — | — |
| Hydropalat WE3220 | BASF | Surfactant, Organically modified polysiloxane | — | — | — | — | 0.35 | — | 0.4 | — | 0.8 | 0.8 | 0.4 | — | — | — | 0.8 |
| BYK-LP G 25182 | Altana | Non-ionic surfactant, polysiloxane; HLB = 10.7 | — | — | — | — | — | — | — | — | — | — | 0.4 | — | — | — | — |
| BYK 349 | Altana | Non-ionic surfactant, polysiloxane; HLB = 10.5 | 0.3 | 0.3 | 0.3 | 0.2 | — | 0.3 | — | 0.2 | — | — | 0.4 | 0.3 | 0.3 | 0.30 | — |
| Water |  |  | balance | balance | balance | balance | balance | balance | balance | balance | balance | balance | balance | balance | balance | balance | balance |
| Viscosity@35° C./mPa s |  |  | 5.7 | 5.5 | 5.4 | 6.4 | 5.8 | 5.4 | 3.7 | 4.8 | 5.3 | 5.4 | 4.0 | 4.8 | 8.0 | 4.2 | 4.51 |
| Static surface tension@25° C./mN/m (σ1) |  |  | 26.6 | 27.9 | 27.2 | 27.64 | 26.6 | 29.3 | 28.2 | 29.5 | 27.5 | 28.2 | 30.2 | 26.6 | 26.7 | 26.8 | 27.7 |
| Static surface tension@25° C. after storage at 40° C. for 30 days/mN/m (σ30) |  |  | 27.0 | 29.0 | 28.8 | 27.61 | 26.7 | — | — | — | — | — | 30.0 | — | — | — | — |
| Heat Abrasion Resistance |  |  | fail 5 | fail 5 | fail 5 | fail 5 | fail 5 | pass 5 | pass 3 | pass 4 | pass 3 | pass 4 | pass 4 | fail 1 | fail 1 | fail 2 | pass 3 |
| Open time/start-up |  |  | — | — | — | — | — | — | — | — | Excellent | Excellent | Excellent | Very poor | Excellent | Excellent | Poor |
| Recirculability |  |  | — | — | — | — | — | — | — | — | — | — | — | — | — | — | — |

TABLE 3

| Film forming agent | Tg [° C.] | Recirculability of inks based on Ink 11 as described in Table 2 wherein the film forming agent of Ink 11 was exchanged 1:1 by the respective film forming agent given in Table 3 (all other components are the same as for Ink 11) | Film forming agent filtration characteristic Measured according to Method 2 |
|---|---|---|---|
| Joncryl 538 | 64 | Poor | Poor |
| Joncryl 8064 | 97 | Excellent | Excellent |
| Joncryl 2189 ECO | 98 | Excellent | Good |
| Joncryl 8050E | −18 | Very poor | Good |
| Experimental high Tg Styrene-acrylic polymer | 165 | Excellent | Excellent |

The invention claimed is:

1. An aqueous pigment concentrate comprising
one or more pigments, wherein the total pigment concentration in the aqueous pigment concentrate is from 5 to 40 wt. %,
one or more pigment dispersing agents, wherein the total pigment dispersing agent concentration in the aqueous pigment concentrate is from 0.5 to 5 wt. %,
one or more non-ionic surfactants with a hydrophilic-lipophilic balance (HLB) value of at least 12, wherein the total concentration of non-ionic surfactants with an HLB value of at least 12 in the aqueous pigment concentrate is from 0.1 to 10 wt. %, and
water as balance;
wherein the ratio of said total non-ionic surfactant concentration to said total pigment dispersing agent concentration is 0.5 to 4.0.

2. The aqueous pigment concentrate of claim 1, wherein the one or more non-ionic surfactants with an HLB value of at least 12 comprise a polyalkoxylated surfactant.

3. The aqueous pigment concentrate of claim 1, wherein the one or more pigment dispersing agents comprise an organic polymer, the organic polymer having pigment affine groups and a weight average molecular weight Mw from 3000 Da to 70000 Da.

4. The aqueous pigment concentrate of claim 1, wherein the one or more pigment dispersing agents comprise an organic polymer, the organic polymer having pigment affine groups, wherein the pigment affine groups comprise acid groups and wherein the polymer has an acid value of at least 150 mgKOH/g.

5. The aqueous pigment concentrate of claim 1, wherein the one or more pigment dispersing agents comprise a pigment dispersing agent with a glass transition temperature Tg of at least 60° C.

6. The aqueous pigment concentrate of claim 1, wherein the one or more pigment dispersing agents comprise a pigment dispersing agent with a glass transition temperature Tg of 20 to 170° C.

7. The aqueous pigment concentrate of claim 1, wherein the aqueous pigment concentrate further comprises one or more pigment wetting agents, wherein the total pigment wetting agent concentration in the aqueous pigment concentrate is from 3 to 15 wt. %.

8. An aqueous ink comprising the aqueous pigment concentrate of claim 1.

9. The aqueous ink of claim 8, further comprising
one or more film forming agents, wherein the total film forming agent concentration in the aqueous ink is from 0.1 to 10 wt.

10. The aqueous ink of claim 8, wherein the aqueous ink additionally comprises one or more surfactants.

11. The aqueous ink of claim 9, wherein the one or more film forming agents have a glass transition temperature Tg of least 80° C.

12. The aqueous pigment concentrate of claim 1, wherein the one or more pigments comprise an organic pigment.

13. The aqueous pigment concentrate of claim 1, wherein the ratio of the sum of said total non-ionic surfactant concentration and said total pigment dispersing agent concentration to said total pigment concentration is from 0.10 to 0.80.

14. The aqueous pigment concentrate of claim 3, wherein the pigment affine groups comprise acid groups.

15. The aqueous pigment concentrate of claim 14, wherein the organic polymer has an acid value in the range of 5 to 300 mgKOH/g.

16. The aqueous pigment concentrate of claim 1, wherein the one or more non-ionic surfactants with an HLB value of at least 12 comprise a polyalkoxylated surfactant and wherein the one or more pigment dispersing agents comprise a pigment dispersing agent with a glass transition temperature Tg of at least 60° C.

17. The aqueous pigment concentrate of claim 16, wherein the aqueous pigment concentrate further comprises one or more pigment wetting agents, wherein the total pigment wetting agent concentration in the aqueous pigment concentrate is from 3 to 15 wt. %.

18. An inkjet printing method, comprising at least the following steps:
providing a substrate, and
printing the aqueous ink of claim 8 onto the substrate by inkjet printing.

19. The inkjet printing method of claim 18, wherein the substrate is one of a corrugated board or a liner for the production of corrugated board.

20. The inkjet printing method of claim 19, wherein said printing occurs in a corrugator or within a corrugated board production line.

* * * * *